US011997413B2

United States Patent
Post, Jr. et al.

(10) Patent No.: US 11,997,413 B2
(45) Date of Patent: May 28, 2024

(54) MEDIA CONTENT PRESENTATION

(71) Applicant: JBF Interlude 2009 LTD, Tel Aviv (IL)

(72) Inventors: Robert A. Post, Jr., Los Angeles, CA (US); Blake Barnes, San Francisco, CA (US); Joseph Burfitt, Los Angeles, CA (US); Eric Buehl, Santa Monica, CA (US); Clifton Smith, Santa Monica, CA (US); Nicholas Allen, Venice, CA (US)

(73) Assignee: JBF Interlude 2009 LTD, Tel Aviv (IL)

(*) Notice: Subject to any disclaimer, the term of this patent is extended or adjusted under 35 U.S.C. 154(b) by 0 days.

(21) Appl. No.: 16/791,568

(22) Filed: Feb. 14, 2020

(65) Prior Publication Data
US 2020/0296317 A1    Sep. 17, 2020

Related U.S. Application Data

(63) Continuation of application No. 16/735,511, filed on Jan. 6, 2020, now abandoned, which is a (Continued)

(51) Int. Cl.
*H04N 5/445* (2011.01)
*G06F 3/04847* (2022.01)
(Continued)

(52) U.S. Cl.
CPC ......... *H04N 5/445* (2013.01); *G06F 3/04847* (2013.01); *G06F 3/0488* (2013.01); *H04N 7/0122* (2013.01); *H04N 21/42204* (2013.01)

(58) Field of Classification Search
CPC ....... H04N 21/440272; H04N 21/4858; H04N 21/47205; G06F 220/1614; G06F 220/1637; G06F 1/1694
(Continued)

(56) References Cited

U.S. PATENT DOCUMENTS 4,305,131 A   12/1981  Best
5,045,844 A    9/1991  Takano et al.
(Continued)

FOREIGN PATENT DOCUMENTS

CA      2878329 C     6/2018
CN    104685894 B     2/2020
(Continued)

OTHER PUBLICATIONS

Non-Final Office Action dated Feb. 27, 2020, for U.S. Appl. No. 16/742,642, filed Jan. 14, 2020, 15 pages.
(Continued)

*Primary Examiner* — Robert J Hance
*Assistant Examiner* — Omer Khalid
(74) *Attorney, Agent, or Firm* — Goodwin Procter LLP

(57) ABSTRACT

A method of presenting media content is disclosed. A plurality of assets is received at a device comprising a display and an orientation sensor. The plurality of assets comprises a first video asset associated with a first aspect ratio, and a second video asset associated with a second aspect ratio, different from the first aspect ratio. A desired aspect ratio is determined based on an output of the orientation sensor. In accordance with a determination that the desired aspect ratio is closer to the first aspect ratio than to the second aspect ratio, the first video asset is selected. In accordance with a determination that the desired aspect ratio is closer to the second aspect ratio than to the first aspect ratio, the second video asset is selected. The selected video is presented at the desired aspect ratio via the display.

24 Claims, 21 Drawing Sheets

Related U.S. Application Data continuation-in-part of application No. 16/405,648, filed on May 7, 2019.

(60) Provisional application No. 62/816,884, filed on Mar. 11, 2019.

(51) Int. Cl.
  *G06F 3/0488* (2022.01)
  *H04N 7/01* (2006.01)
  *H04N 21/422* (2011.01)

(58) Field of Classification Search
  USPC .......................................................... 348/445
  See application file for complete search history.

(56) References Cited

U.S. PATENT DOCUMENTS

| | | |
|---|---|---|
| 5,396,590 A | 3/1995 | Kreegar |
| 5,400,077 A | 3/1995 | Cookson |
| 5,465,384 A | 11/1995 | Bejan et al. |
| 5,559,999 A | 9/1996 | Maturi et al. |
| 5,600,368 A | 2/1997 | Matthews, III |
| 5,640,388 A | 6/1997 | Woodhead et al. |
| 5,727,129 A | 3/1998 | Barrett et al. |
| 5,751,953 A | 5/1998 | Shiels et al. |
| 5,894,320 A | 4/1999 | Vancelette |
| 6,128,712 A | 10/2000 | Hunt et al. |
| 6,137,468 A | 10/2000 | Martinez et al. |
| 6,144,375 A | 11/2000 | Jain et al. |
| 6,161,115 A | 12/2000 | Ohanian |
| 6,326,978 B1 | 12/2001 | Robbins |
| 6,505,169 B1 | 1/2003 | Bhagavath et al. |
| 6,615,270 B2 | 9/2003 | Gould et al. |
| 6,621,980 B1 | 9/2003 | Gould et al. |
| 6,738,427 B2 | 5/2004 | Zetts |
| 6,907,570 B2 | 6/2005 | Amir et al. |
| 7,487,468 B2 | 2/2009 | Tanaka et al. |
| 7,577,963 B2 | 8/2009 | Ofarrell et al. |
| 7,594,025 B2 | 9/2009 | Colville et al. |
| 7,642,442 B2 | 1/2010 | Adam et al. |
| 7,707,273 B2 | 4/2010 | Jones |
| 7,743,183 B2 | 6/2010 | Virdi et al. |
| 7,877,690 B2 | 1/2011 | Margulis |
| 7,889,975 B2 | 2/2011 | Slone |
| 7,890,648 B2 | 2/2011 | Gould et al. |
| 7,952,569 B2 | 5/2011 | Hunt |
| 8,001,471 B2 | 8/2011 | Shaver et al. |
| 8,015,167 B1 | 9/2011 | Riggs et al. |
| 8,112,711 B2 | 2/2012 | Ackley |
| 8,174,628 B2 | 5/2012 | Matsushita |
| 8,176,425 B2 | 5/2012 | Wallace et al. |
| 8,201,202 B2 | 6/2012 | Ota |
| 8,229,287 B1 | 7/2012 | Duggal et al. |
| 8,238,419 B2 | 8/2012 | Chui et al. |
| 8,265,167 B2 | 9/2012 | Lynch et al. |
| 8,301,794 B2 | 10/2012 | Salomons |
| 8,392,600 B2 | 3/2013 | Outlaw |
| 8,402,492 B2 | 3/2013 | Amira et al. |
| 8,458,595 B1 | 6/2013 | Margulis |
| 8,482,635 B2 | 7/2013 | Peters et al. |
| 8,484,369 B2 | 7/2013 | Jones |
| 8,489,760 B2 | 7/2013 | Visharam et al. |
| 8,510,459 B2 | 8/2013 | Parker et al. |
| 8,526,782 B2 | 9/2013 | Kaiser et al. |
| 8,549,571 B2 | 10/2013 | Loher et al. |
| 8,600,220 B2 | 12/2013 | Bloch et al. |
| 8,670,072 B1 | 3/2014 | Liang |
| 8,683,350 B2 | 3/2014 | Lahr et al. |
| 8,693,553 B2 | 4/2014 | Vaquero et al. |
| 8,750,682 B1 | 6/2014 | Nicksay et al. |
| 8,752,100 B2 | 6/2014 | Ramakrishnan et al. |
| 8,842,971 B2 | 9/2014 | Pontual et al. |
| 8,860,882 B2 | 10/2014 | Bloch et al. |
| 8,868,772 B2 | 10/2014 | Major et al. |
| 8,873,928 B2 | 10/2014 | Lim et al. |
| 8,886,752 B2 | 11/2014 | Styles |
| 8,898,311 B2 | 11/2014 | Kikkawa et al. |
| 8,953,079 B2 | 2/2015 | Raju |
| 8,954,596 B2 | 2/2015 | Ronca et al. |
| 9,009,337 B2 | 4/2015 | Ronca |
| 9,009,619 B2 | 4/2015 | Bloch et al. |
| 9,106,627 B2 | 8/2015 | Campbell et al. |
| 9,118,814 B2 | 8/2015 | Janardhan et al. |
| 9,143,826 B2 | 9/2015 | Vestergaard et al. |
| 9,153,031 B2 | 10/2015 | El-saban |
| 9,190,110 B2 | 11/2015 | Bloch |
| 9,215,262 B2 | 12/2015 | Oyman |
| 9,229,230 B2 | 1/2016 | Scales et al. |
| 9,253,229 B1 | 2/2016 | Strothmann |
| 9,257,148 B2 | 2/2016 | Bloch et al. |
| 9,271,015 B2 | 2/2016 | Bloch et al. |
| 9,294,526 B2 | 3/2016 | George |
| 9,330,172 B2 | 5/2016 | Elsner et al. |
| 9,357,272 B2 | 5/2016 | Oyman |
| 9,418,012 B2 | 8/2016 | De Vleeschauwer et al. |
| 9,430,115 B1 | 8/2016 | Yun |
| 9,432,433 B2 | 8/2016 | Luby et al. |
| 9,436,767 B2 | 9/2016 | Gordon |
| 9,449,648 B2 | 9/2016 | Lagemann et al. |
| 9,520,155 B2 | 12/2016 | Bloch et al. |
| 9,530,454 B2 | 12/2016 | Bloch et al. |
| 9,607,655 B2 | 3/2017 | Bloch et al. |
| 9,609,275 B2 | 3/2017 | Kuusela |
| 9,620,172 B2 | 4/2017 | Knight et al. |
| 9,641,898 B2 | 5/2017 | Bloch et al. |
| 9,653,115 B2 | 5/2017 | Bloch et al. |
| 9,672,868 B2 | 6/2017 | Bloch et al. |
| 9,792,026 B2 | 10/2017 | Bloch et al. |
| 9,792,957 B2 | 10/2017 | Bloch et al. |
| 9,817,549 B2 | 11/2017 | Chandrasekaran |
| 9,832,516 B2 | 11/2017 | Bloch et al. |
| 9,860,477 B2 | 1/2018 | Kummer |
| 10,069,898 B2 | 9/2018 | Jones |
| 10,108,274 B2 | 10/2018 | Nicholls |
| 10,178,304 B1 | 1/2019 | Tudor |
| 10,218,760 B2 | 2/2019 | Vishnia et al. |
| 10,237,595 B2 | 3/2019 | Mccue et al. |
| 10,257,578 B1 | 4/2019 | Bloch et al. |
| 10,418,066 B2 | 9/2019 | Bloch et al. |
| 10,448,119 B2 | 10/2019 | Bloch et al. |
| 10,460,765 B2 | 10/2019 | Bloch et al. |
| 10,462,202 B2 | 10/2019 | Bloch et al. |
| 10,474,334 B2 | 11/2019 | Bloch et al. |
| 10,523,982 B2 | 12/2019 | Oyman |
| 10,554,926 B1 | 2/2020 | Post, Jr. |
| 10,582,265 B2 | 3/2020 | Bloch et al. |
| 10,585,546 B2 | 3/2020 | Basapur et al. |
| 10,692,540 B2 | 6/2020 | Bloch et al. |
| 10,755,747 B2 | 8/2020 | Bloch et al. |
| 10,856,049 B2 | 12/2020 | Bloch et al. |
| 10,885,944 B2 | 1/2021 | Bloch et al. |
| 2002/0133247 A1 | 9/2002 | Smith |
| 2002/0194595 A1 | 12/2002 | Miller et al. |
| 2003/0055995 A1 | 3/2003 | Ala-honkola |
| 2006/0064733 A1 | 3/2006 | Norton et al. |
| 2006/0153537 A1 | 7/2006 | Kaneko |
| 2007/0024705 A1 | 2/2007 | Richter |
| 2007/0085759 A1 | 4/2007 | Lee |
| 2007/0122786 A1 | 5/2007 | Relan et al. |
| 2007/0253677 A1 | 11/2007 | Wang |
| 2008/0195546 A1 | 8/2008 | Lilley |
| 2009/0022165 A1 | 1/2009 | Candelore et al. |
| 2009/0037972 A1 | 2/2009 | Pontual et al. |
| 2009/0044128 A1 | 2/2009 | Baumgarten |
| 2009/0055880 A1 | 2/2009 | Batteram et al. |
| 2009/0063681 A1 | 3/2009 | Ramakrishnan et al. |
| 2009/0100188 A1 | 4/2009 | Li et al. |
| 2009/0168903 A1 | 7/2009 | Vaquero et al. |
| 2009/0225026 A1 | 9/2009 | Sheba |
| 2009/0256859 A1 | 10/2009 | Komorowski |
| 2010/0082635 A1 | 4/2010 | Elsner et al. |
| 2010/0234007 A1 | 9/2010 | Shao |
| 2010/0299630 A1 | 11/2010 | Mccutchen |

(56) References Cited

U.S. PATENT DOCUMENTS

| | | |
|---|---|---|
| 2011/0007797 A1 | 1/2011 | Palmer et al. |
| 2011/0096225 A1 | 4/2011 | Candelore |
| 2011/0182366 A1 | 7/2011 | Frojdh et al. |
| 2011/0193982 A1 | 8/2011 | Kook |
| 2011/0200116 A1 | 8/2011 | Bloch et al. |
| 2011/0202562 A1 | 8/2011 | Bloch et al. |
| 2011/0276333 A1 | 11/2011 | Wang et al. |
| 2012/0032979 A1* | 2/2012 | Blow .................. G06F 1/1626 345/173 |
| 2012/0094768 A1 | 4/2012 | Mccaddon et al. |
| 2012/0110317 A1 | 5/2012 | Scheer et al. |
| 2012/0110618 A1 | 5/2012 | Kilar et al. |
| 2012/0147954 A1 | 6/2012 | Kasai |
| 2012/0178070 A1 | 7/2012 | Wiegand et al. |
| 2012/0229370 A1 | 9/2012 | Stroffolino |
| 2012/0278497 A1 | 11/2012 | Hsu |
| 2013/0028446 A1 | 1/2013 | Krzyzanowski |
| 2013/0047074 A1 | 2/2013 | Vestergaard et al. |
| 2013/0054728 A1 | 2/2013 | Amir et al. |
| 2013/0055321 A1 | 2/2013 | Cline et al. |
| 2013/0097643 A1 | 4/2013 | Stone et al. |
| 2013/0129304 A1 | 5/2013 | Feinson |
| 2013/0202265 A1 | 8/2013 | Arrasvuori |
| 2013/0235152 A1 | 9/2013 | Hannuksela et al. |
| 2013/0235270 A1 | 9/2013 | Sasaki et al. |
| 2013/0290818 A1 | 10/2013 | Arrasvuori et al. |
| 2013/0291002 A1 | 10/2013 | Rothschild et al. |
| 2013/0301918 A1 | 11/2013 | Frenkel |
| 2014/0015940 A1 | 1/2014 | Yoshida |
| 2014/0040959 A1 | 2/2014 | Oyman |
| 2014/0108622 A1 | 4/2014 | Guo |
| 2014/0152564 A1 | 6/2014 | Gulezian |
| 2014/0210860 A1 | 7/2014 | Caissy |
| 2014/0279032 A1 | 9/2014 | Roever |
| 2014/0314239 A1 | 10/2014 | Meyer |
| 2014/0368669 A1 | 12/2014 | Talvala et al. |
| 2015/0035750 A1* | 2/2015 | Bailey .................. G06F 3/0346 345/158 |
| 2015/0042704 A1 | 2/2015 | Smith et al. |
| 2015/0058115 A1 | 2/2015 | Iwaki et al. |
| 2015/0063781 A1 | 3/2015 | Silverman et al. |
| 2015/0070458 A1 | 3/2015 | Kim |
| 2015/0089074 A1 | 3/2015 | Oyman |
| 2015/0124171 A1 | 5/2015 | King |
| 2015/0201187 A1 | 7/2015 | Ryo |
| 2015/0208103 A1 | 7/2015 | Guntur |
| 2015/0256861 A1 | 9/2015 | Oyman |
| 2015/0326912 A1* | 11/2015 | Casagrande ..... H04N 21/44008 386/230 |
| 2015/0331933 A1 | 11/2015 | Tocchini, IV |
| 2015/0348325 A1 | 12/2015 | Voss |
| 2016/0063529 A1 | 3/2016 | Roeding et al. |
| 2016/0065831 A1 | 3/2016 | Howard |
| 2016/0105724 A1 | 4/2016 | Bloch et al. |
| 2016/0142889 A1 | 5/2016 | O'Connor |
| 2016/0170948 A1 | 6/2016 | Bloch |
| 2016/0173944 A1 | 6/2016 | Kilar |
| 2016/0241617 A1 | 8/2016 | Jelley |
| 2016/0323608 A1 | 11/2016 | Bloch et al. |
| 2016/0365117 A1 | 12/2016 | Boliek |
| 2017/0171275 A1 | 6/2017 | Bloch et al. |
| 2017/0178409 A1 | 6/2017 | Bloch et al. |
| 2017/0178601 A1 | 6/2017 | Bloch et al. |
| 2017/0201779 A1* | 7/2017 | Publicover ......... H04N 21/4532 |
| 2017/0223083 A1 | 8/2017 | Maze |
| 2017/0295410 A1 | 10/2017 | Bloch et al. |
| 2017/0345460 A1 | 11/2017 | Bloch et al. |
| 2018/0014049 A1* | 1/2018 | Griffin ............. H04N 21/23439 |
| 2018/0130501 A1 | 5/2018 | Bloch et al. |
| 2018/0191574 A1 | 7/2018 | Vishnia et al. |
| 2018/0254067 A1* | 9/2018 | Elder .................. G03B 17/561 |
| 2018/0367840 A1* | 12/2018 | Kleinerman ....... H04N 21/4821 |
| 2019/0005549 A1 | 1/2019 | Goldshtein et al. |
| 2019/0075340 A1 | 3/2019 | Hochart |
| 2019/0090002 A1 | 3/2019 | Ramadorai |
| 2019/0349637 A1 | 11/2019 | Bloch et al. |
| 2019/0373330 A1 | 12/2019 | Bloch et al. |
| 2019/0392868 A1 | 12/2019 | Bloch et al. |
| 2020/0016746 A1 | 1/2020 | Yap |
| 2020/0194037 A1 | 6/2020 | Bloch et al. |
| 2020/0296316 A1 | 9/2020 | Post, Jr. |
| 2020/0296317 A1 | 9/2020 | Post, Jr. et al. |
| 2020/0296325 A1 | 9/2020 | Post, Jr. |
| 2020/0296462 A1 | 9/2020 | Post, Jr. |
| 2020/0365187 A1 | 11/2020 | Bloch et al. |
| 2020/0404382 A1 | 12/2020 | Bloch et al. |
| 2021/0045713 A1* | 2/2021 | Poland ................ A61B 8/4427 |
| 2021/0105433 A1 | 4/2021 | Bloch et al. |
| 2021/0209655 A1 | 7/2021 | Post, Jr. |

FOREIGN PATENT DOCUMENTS

| | | |
|---|---|---|
| EP | 2430631 | 3/2012 |
| EP | 2678862 | 1/2014 |
| EP | 2712206 | 3/2014 |
| EP | 3013064 B1 | 3/2019 |
| GB | 2558086 | 2/2019 |
| JP | 2010258732 | 11/2010 |
| JP | 6516766 B2 | 5/2019 |
| KR | 100619034 | 8/2006 |
| KR | 101773689 B1 | 8/2017 |
| TW | 201218770 A | 5/2012 |
| WO | 2005071683 | 8/2005 |
| WO | 2007117298 | 10/2007 |
| WO | 2010078281 A2 | 7/2010 |
| WO | 2010131244 | 11/2010 |
| WO | 2012114329 | 8/2012 |
| WO | 2012114330 | 8/2012 |
| WO | 2012168365 A1 | 12/2012 |
| WO | 2013016707 A1 | 1/2013 |
| WO | 2013150378 | 10/2013 |
| WO | 2014022018 A1 | 2/2014 |
| WO | 2015144735 A1 | 10/2015 |

OTHER PUBLICATIONS

International Search Report and Written Opinion dated Apr. 21, 2020, for PCT Application No. PCT/US2020/021932, six pages.

Non-Final Office Action dated Aug. 18, 2020, for U.S. Appl. No. 16/735,511, filed Jan. 6, 2020, nine pages.

Non-Final Office Action dated Dec. 30, 2019, for U.S. Appl. No. 16/405,648, filed May 7, 2019, 14 pages.

Non-Final Office Action dated Jul. 25, 2019, for U.S. Appl. No. 16/416,081, filed May 17, 2019, nine pages.

Notice of Allowance dated Sep. 19, 2019, for U.S. Appl. No. 16/416,081, filed May 17, 2019, 8 pages.

DASH Industry Forum. (Nov. 15, 2018). "Guidelines for Implementation:DASH-IF Interoperability Points," Version 4.3, 254 pages. (submitted in 3 parts).

Dungate, Scott. (2014). "HONDA: The Other Side," located at: www.scottdungate.com/honda-the-other-side-gallery, retrieved on May 6, 2020, three pages.

D'Acuntotno, Lucia, et al. (2016). "Using MPEG DASH SRD for zoomable and navigable video," MMSys'16 May 10-13, 2016, Klagenfurt, Austria, located at: DOI: http://dx.doi.org/10.1145/2910017.2910634 , 4 pages.

FFMPEG. (2016). "Video grid with vstack and hstack [duplicate]," located at: https://stackoverflow.com/questions/36268431/video-grid-with-vstack-and-hstack retrieved Jan. 27, 2021, three pages.

FFMPEG. (2018). "How to Stitch Videos Together, Horizontally and Vertically Stitching," located at: https://github.com/stoyanovgeorge/ffmpeg/wiki/How-to-Stitch-Videos-Together , retrieved Jan. 27, 2021, four pages.

FFMPEG. (date unknown). "man ffmpeg (1): ffmpeg video converter," located at: www.manpages.org/ffmpeg , retrieved Jan. 27, 2021, 657 pages.

Final Office Action dated May 4, 2021, for U.S. Appl. No. 16/735,511, filed Jan. 6, 2020, 12 pages.

Final Office Action dated Oct. 27, 2020, for U.S. Appl. No. 16/405,648, filed May 7, 2019, 13 pages.

(56) References Cited

OTHER PUBLICATIONS

HTTP Live Streaming. (date unknown). "HLS Authoring Specification for Apple Devices," Apple Developer Documentation, located at: https://developer.apple.com/documentation/http_live_streaming/hls_authoring_specification_for_apple_devices retrieved Jan. 27, 2021, thirty pages.

International Search Report and Written Opinion dated Mar. 11, 2021, for PCT Application No. PCT/US2021/012376, eight pages.

International Search Report and Written Opinion dated Mar. 25, 2021, for PCT/US21/12378, filed Jan. 6, 2021, twelve pages.

Khiem, et al. (2011). Tiled Streaming Presentation "Adaptive Encoding , Zoomable Video Streams based on User Access Pattern,", National University of Singapore, 31 pages.

Khiem, et al. (2011). "Adaptive Encoding , Zoomable Video Streams based on User Access Pattern," MMSys'11, Feb. 23-25, 2011, San Jose, California, USA, 12 pages.

Lürzer's Archive (Nov. 20, 2014). "Honda's clever spot lets you switch between parallel storylines," located at: https://www.luerzersarchive.com/en/features/digital/hondas-clever-spot-lets-you-switch-between-parallel-storylines-711.html, retrieved Jan. 27, 2021, ten pages.

Miller, G. et al. (2009). "MiniDiver: A Novel Mobile Media Playback Interface for Rich Video Content on an iPhoneTM," IFIP International Federation for Information Processing 2, ICEC 5709, pp. 98-109.

MPEG2TS Stream—Transport Stream. (Dec. 17, 2014). "Rusty Techie," located at: http://rustytechie.blogspot.com/2014/12/mpeg2ts-stream-transport-stream.html retrieved Jan. 27, 2021, six pages.

Notice of Allowability dated Feb. 12, 2021, for U.S. Appl. No. 16/742,642, filed Jan. 14, 2020, eight pages.

Notice of Allowance dated Oct. 27, 2020, for U.S. Appl. No. 16/742,642, filed Jan. 14, 2020, seven pages.

Paul B Mahol . (2015). "[FFMPEG-user] mosaic video 2×2, 3×3 etc.," located at: https://lists.ffmpeg.org/pipermail/ffmpeg-user/2015-December/029493.html, retrieved Jan. 27, 2021, three pages.

Prins, M. J. et al. (2013). "A Hybrid Architecture for Delivery of Panoramic Video," EurolTV'13, Jun. 24-26, 2013, Como, Italy., 8 pages.

Takacs, B. (Mar. 10, 2010). "Immersive interactive reality: Internet-based on-demand VR for cultural presentation," Cultural Technology, Springer-Verlag London Limited 2010, thirteen pages.

Xu, Y. et al. (2018), "Omnidirectional Media Format and Its Application to Immersive Video Streaming: An Overview," located at: https://docplayer.net/151550752-Omnidirectional-media-format-and-its-application-to-immersive-video-streaming-an-overview.html 11 pages.

Adobe Systems Incorporated, (1998). "Adobe Photoshop, version 5.0," User Guide, 400 pages.

Barrett, Rob, et al. (1997). "How to Personalize the Web," CHI 97, Atlanta, GA, USA, eight pages.

Barthel, Ralph, et al. (Feb. 2012). "Collaborative knowledge building with shared video representations," EISEVIER, available at: www.sciencedirect.com, 17 pages.

Broida, Rick (Nov. 3, 2006). "Download of the Day Fasterfox (Firefox)," three pages.

CTA Bulletin. (Jul. 2009). "AV Synchronization Processing Recommended Practice," Consumer Technology Association, 21 pages.

Decision. (Oct. 23, 2017). "*Radware, Inc.*, Petitioner, v. *F5 Networks, Inc.*, Patent Owner.", Case IPR2017-01249 U.S. Pat. No. 6,311,278 B1.

Decision. (Dec. 21, 2016). "*Global Tel Link Corporation*, Petitioner, v. *Securus Technologies, Inc.*, Patent Owner," Case IPR2015-01226, U.S. Pat. No. 8,135,115 B1.

Decision. (Feb. 27, 2020). "*Stephanie Barnard Designs, Inc.*, Petitioner, v. *Ellison Educational Equipment, Inc.*, Patent Owner," IPR2020-00150, U.S. Pat. No. 9,079,325 B2.

Decision. (Jan. 19, 2016). "*Daifuku Co., Ltd.* and *Daifuku America Corp.*, Petitioner, v. *Murata Machinery, Ltd.*, Patent Owner.", Case IPR2015-01538, U.S. Pat. No. 6,113,341.

Decision. (Jul. 7, 2017). "*Vizio, Inc.*, Petitioner, v. *Nichia Corporation*, Patent Owner," Case IPR2017-00551, U.S. Pat. No. 7,915,631 B2.

Decision. (May 11, 2016). "*Enovate Medical, LLC*, Petitioner, v. *Intermetro Industries Corporation*, Patent Owner," Case IPR2015-00300, U.S. Pat. No. 6,721,178 B1.

Decision. (Sep. 6, 2018). "*Sirius XM Radio, Inc.*, Petitioner, v. *Fraunhofer-Gesellschaft Zur Förderung Der Angewandten Forschung E.V.*, Patent Owner," Case IPR2018-00681 U.S. Pat. No. 7,061,997 B1.

Edgar, Edmund. (2006). Prefetching Hints-Helping Firefox and Google Speed up your site, The Prefetching Problem, 3 pages.

Fisher. (2003). "Link prefetching FAQ," MDN web docs, 6 pages.

Gao, Zhenhuan et al. (Nov. 3-7, 2014). "FreeViewer: An Intelligent Director for 3D Tele-Immersion System," Orlando, Florida, USA, located at: http://dx.doi.org/10.1145/2647868.2654873.

Gao, Zhenhuan et al. (Oct. 2015). "OmniViewer: Enabling Multi-modal 3D DASH," Brisbane, Australia, located at: http://dx.doi.org/10.1145/2733373.2807971.

GPAC, Multimedia Open Source Project, located at: https://gpac.wp.imt.fr/home/gpac-features/ retrieved May 24, 2021, two pages.

Hailin Xie, et al. (2009). "An Efficient Caching Mechanism for Video-on-Demand Service over Peer-to-Peer Network," IEEE Computer Society,The Eighth IEEE International Conference on Embedded Computing, 6 pages.

IAB. (Apr. 10, 2012). "Video Player-Ad Interface Definition (VPAID), Version 2.0" located: http://www.iab.net/videosuite/vpaid, 58 pages.

IAB. (Nov. 2009). "Digital Video Ad Serving Template (VAST) Version 2.0," located at: http://www.iab.net/vast, 16 pages.

International Search Report dated Jul. 31, 2013, for PCT Application No. PCT/IB2013/001000, eleven pages.

International Standard, (2005). "Information technology—Generic coding of moving pictures and associated audio information: Systems," Second edition Dec. 1, 2000, ISO/IEC.

International Standard, (2005). "Information technology—Coding of audio-visual objects," Part 12: ISO base media file format, ISO/IEC 14496-12.

ITU-T. (Apr. 2015). "High efficiency video coding," H.265, Rec. ITU-T H.265 v3 (Apr. 2015).

Jan van der Meer, (2014). "Fundamentals and Evolution of MPEG 2 Systems," 2014 John Wiley & Sons, Ltd.

Kaspar, Dominik, et al. (2010). "Enhancing Video-on-Demand Playout over Multiple Heterogeneous Access Networks," 2010 IEEE , 5 pages.

Kaspar, Dominik, et al. (2010). "Using HTTP Pipelining to Improve ProgressiveDownload over Multiple Heterogeneous Interfaces," IEEE Communications Society, 5 pages.

Khemmarat, Samamon, et al. (2011). "Watching User Generated Videos with Prefetching," Feb. 23-25, 2011, San Jose, CA, USA, 12 pages.

Lieberman, Henry. (Aug. 1995). "Letizia: An Agent That Assists Web Browsing," Proceedings of the 14th International joint conference on Artificial intelligence—vol. 1, pp. 924-929.

Lourdes Beloqui, et al. (2015). "Understanding Timelines within MPEG Standards," IEEE Communications Surveys & Tutorials, 33 pages.

MDialog. (Apr. 7, 2010). "mDialog Debuts First Dynamic Ad-Insertion and Video Solution Platform for HTML5 VOD and Live Streaming on iPad and iPhone," mDialog, located at: https://www.globenewswire.com/news-release/2010/04/07/1062211/0/en/mDialog-Debuts-First-Dynamic-Ad-Insertion-and-Video-Solution-Platform-for-HTML5-VOD-and-Live-Streaming-on-iPad-and-iPhone.html.

NAB. (Aug. 3, 2009). "CEA Publishes Recommended Practice on A/V Synchronization Implementation in Receivers," TV TechCheck, 3 pages.

Pantos, R. et al. (Mar. 23, 2012). "HTTP Live Streaming draft-pantos-http-live-streaming-08," Apple Inc. 33 pages.

Riiser, Haakon, et al. (2011). "Video Streaming Using a Location-based Bandwidth-Lookup Service for Bitrate Planning," ACM Transactions on Multimedia Computing, Communications and Applications, vol. 0, No. 0, Article 0, twenty four pages.

Robert Skupin, et al. (2016). "Tile Based HEVC Video for Head Mounted Displays," 2016 IEEE International Symposium on Mul-

(56) References Cited

OTHER PUBLICATIONS timedia, Exhibit A, Case 2:20-cv-02299-JAK-SK Document 64-18 Filed Apr. 24, 2020 p. 1 of 3 p. ID #:4064.

Romulus Grigoras, et al. (2002). "Optimizing Hypervideo Navigation using a Markov Decision Process Approach," 10 pages.

SMIL. (Date Unknown). "SMIL 3.0 Content Control," https://www.w3.org/TR/REC-smil/smil-content.html.

SMIL. (Dec. 1, 2008). "Synchronized Multimedia Integration Language (SMIL 3.0)," W3C, 20 pages. http://www.w3.org/TR/2008/REC-SMIL3-20081201/.

Sodagar, Iraj, (2011). "The MPEG-DASH Standard for Multimedia Streaming Over the Internet," Industry and Standards, IEEE Computer Society.

Taylor, Jim, et al. (2001). "DVD Demystified," Second Edition, The McGraw-Hill Companies.

Taylor, Jim, et al. (2006). "DVD Demystified," Third Edition, The McGraw-Hill Companies.

Tektronix, (2012). "A Guide to MPEG Fundamentals and Protocol Analysis," Updated with QoS/QoE Diagnostics and Troubleshooting Primer, www.tektronix.com/video_audio.

U.S. Appl. No. 61/732,536, filed Dec. 3, 2012.

Wei Zhang, et al. (2003). "Personalized Web Prefetching in Mozilla," Department of Computer Science and Engineering, Lehigh University, Bethlehem, PA.

Williams_Decl_Exhibit_D_PUBLIC, (Apr. 13, 2020). "Merge two video clips into one, placing them next to each other,"—Unix & Linux Stack Exchange, Exhibit D, Case 2:20-cv-02299-JAK-SK Document 42-40 Filed Apr. 14, 2020 p. 1 of 5 p. ID #:3125, located at: https://unix.stackexchange.com/questions/233832/merge-tw,o-video-clips-into-one-placing-them-next-to-each other.

Williams_Decl_Exihibit_C_PUBLIC, (Apr. 13, 2020). "How do I make videos side by side (both playing at the same time) in Premiere Pro or After Effects," Exhibit C, Case 2:20-cv-02299-JAK-SK Document 42-39 Filed Apr. 14, 2020 p. 1 of 8 p. ID #:3117, located at: https://www.quora.com/How-do-I-make-videos-side-by-side-both-playing-at-the-same-time-in-Premiere-Pro-or-After-Effects.

U.S. Appl. No. 16/405,648 Published as US2020/0296462, Media Content Presentation, filed May 7, 2019.

U.S. Appl. No. 16/416,081 U.S. Pat. No. 10,554,926, Media Content Presentation, filed May 17, 2019.

U.S. Appl. No. 16/742,642 Published as US2020/0296325, Media Content Presentation, filed Jan. 14, 2020.

U.S. Appl. No. 16/735,511 Published as US2020/0296316, Media Content Presentation, filed Jan. 6, 2020.

Non-Final Office Action dated Nov. 19, 2020, for U.S. Appl. No. 16/791,568, filed Feb. 14, 2020, 10 pages.

Yuste, L. B., et al. (2015) "Understanding Timelines within MPEG Standards", IEEE Communications Surveys & Tutorials, 33 pages.

* cited by examiner

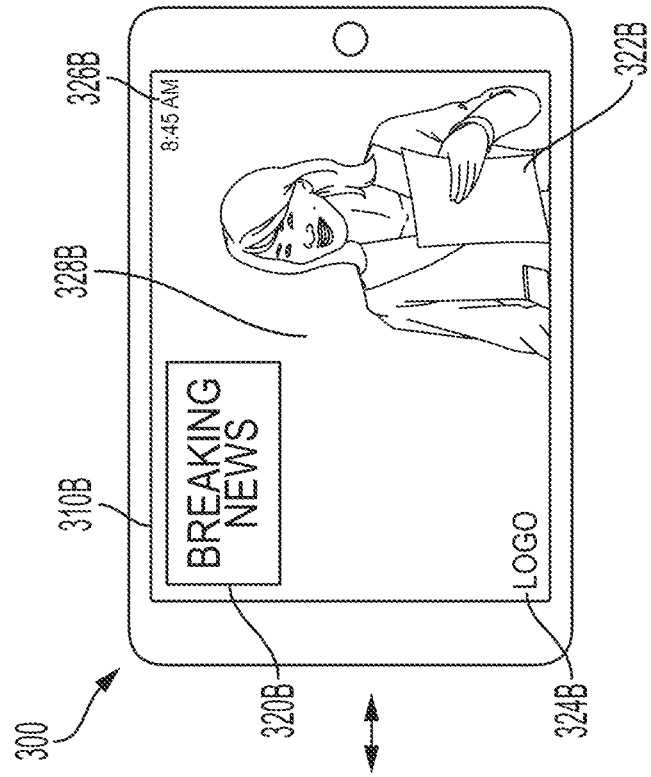
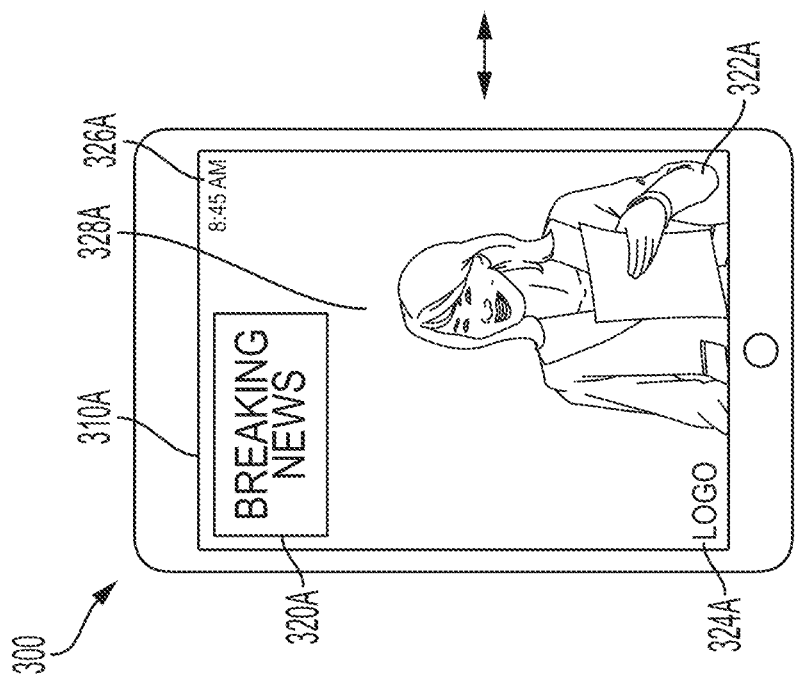

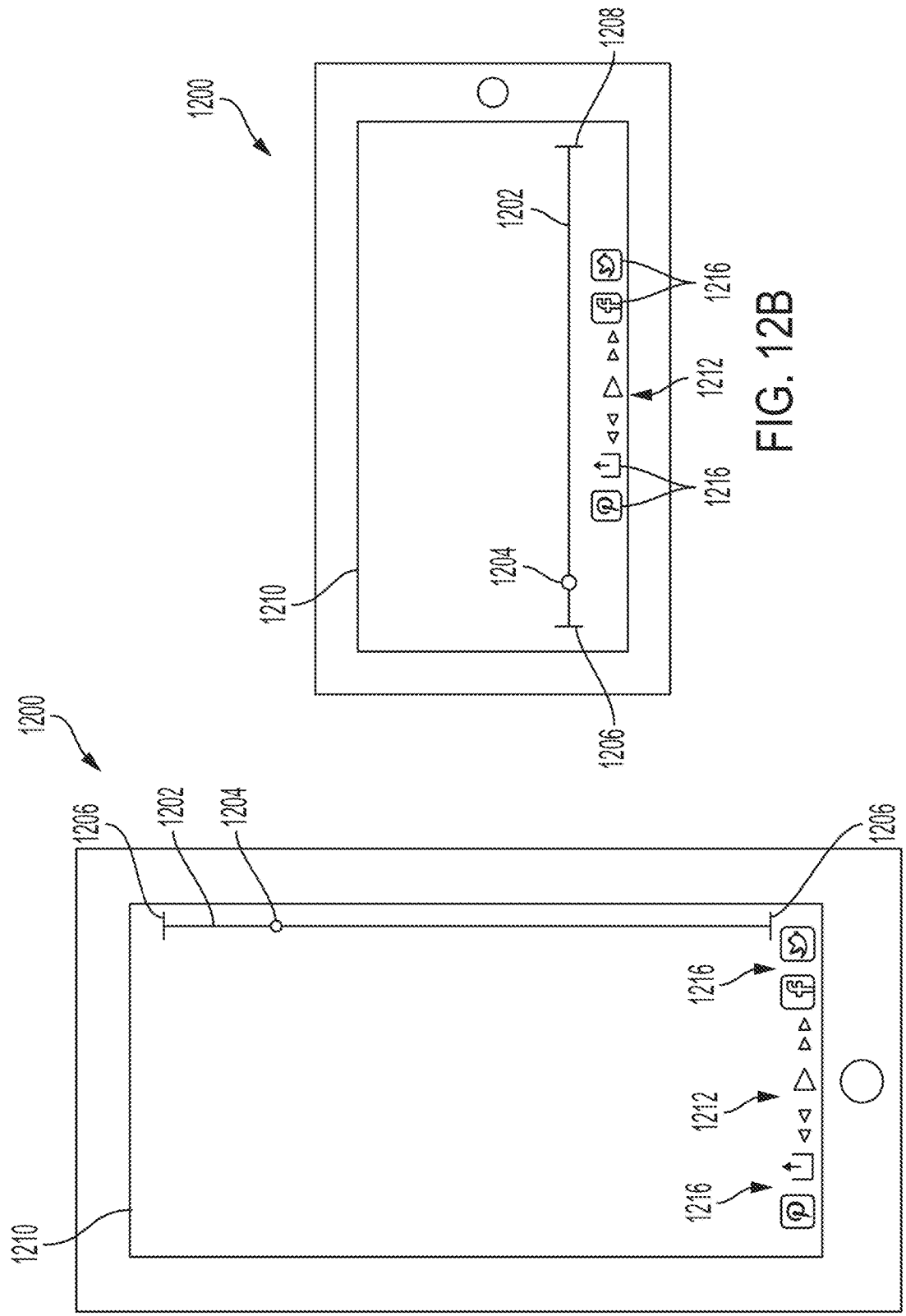

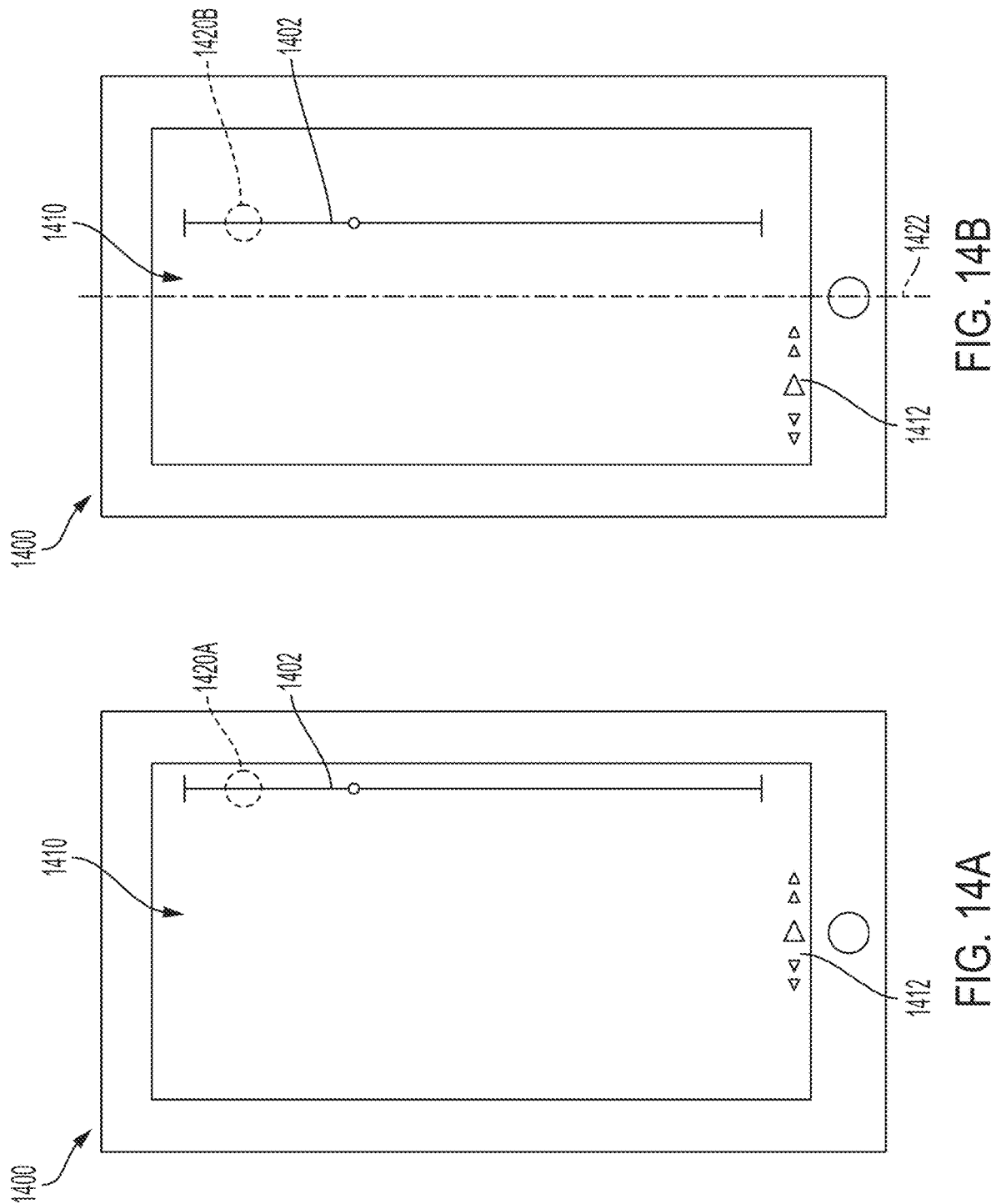

MEDIA CONTENT PRESENTATION

CROSS-REFERENCE TO RELATED APPLICATIONS

This application is a continuation of U.S. patent application Ser. No. 16/735,511, filed Jan. 6, 2020 which is a continuation-in-part of U.S. patent application Ser. No. 16/405,648, filed May 7, 2019, which claims priority to U.S. Provisional Application Serial No. 62/816,884, filed Mar. 11, 2019, both of which applications are hereby incorporated by reference in their entirety.

FIELD

Examples of the disclosure relate generally to systems and methods for presenting media content to a user of a computing device, and more specifically, to systems and methods for presenting media content including video to a user of a mobile computing device.

BACKGROUND

With the growth of video-capable mobile devices, such as smartphones, tablets, and wearable devices, users' media viewing habits have gradually shifted out of the living room, and into the outside world—into every corner and crevice where these devices can be used. Similarly, this shift has displaced the traditional television set—a bulky screen designed to be mounted semi-permanently in a single place, such as on a wall or on a flat surface—in favor of small, portable screens that can be viewed in virtually any position, and in virtually any orientation.

Such mobile devices place new demands on video content. One such demand relates to the aspect ratio (e.g., the ratio of a display width to a display height) of the video content. Under desired viewing conditions, a native aspect ratio of a video asset (e.g., a source file containing video content) matches the aspect ratio of the display on which the video asset is presented. For example, when viewing a video asset on a display having a 16:9 aspect ratio, it is desirable that the video asset itself have a 16:9 aspect ratio. If the video asset has an aspect ratio that differs from the aspect ratio of the display, one of two conventional solutions can be used to format the video asset for the display: either the video asset can be cropped to fit the display (e.g., via "pan and scan" techniques); or the video asset can be "letterboxed" by adding dummy content (e.g., black bars) to fill the regions of the display unoccupied by the video asset. Neither solution is desirable: cropping the video asset results in the cropped content being unviewable on the display (which can affect the viewer's understanding or appreciation of the video asset); and letterboxing the video asset results in regions of the display being effectively unused (which can impair visibility, especially on mobile devices with limited display space).

A preferred solution is to anticipate the aspect ratio of the display on which video content will be viewed, and to provide to the display a video asset that matches that aspect ratio. But this approach is frustrated by mobile device displays that change aspect ratios as the user changes the orientation of the device. For instance, a display may be in a "portrait" mode (e.g., in which the aspect ratio is less than unity) when a device is held upright, but may shift to a "landscape" mode (e.g., in which the aspect ratio is greater than unity) when the device is rotated 90 degrees to the left or the right. A solution is needed for seamlessly switching between aspect ratios of video content without resorting to cropping or letterboxing techniques.

Further, users of mobile devices demand that video content be data-efficient: that is, that the video content respect the limited data storage capacity of many mobile devices, and the cost and overhead of downloading large files on consumer data plans; and that it accommodate the high latency, low bandwidth network conditions in which mobile devices may operate. The present disclosure describes such one or more solutions, which improve on conventional approaches by providing a data-efficient mechanism for quickly and seamlessly changing an aspect ratio of video content on a mobile device display.

BRIEF SUMMARY

Examples of the disclosure describe systems and methods of presenting media content. According to examples of the disclosure, a plurality of assets is received at a device comprising a display and an orientation sensor. The plurality of assets comprises a first video asset associated with a first aspect ratio, and a second video asset associated with a second aspect ratio, different from the first aspect ratio. A desired aspect ratio is determined based on an output of the orientation sensor.

In accordance with a determination that the desired aspect ratio is closer to the first aspect ratio than to the second aspect ratio, the first video asset is selected. In accordance with a determination that the desired aspect ratio is closer to the second aspect ratio than to the first aspect ratio, the second video asset is selected. The selected video is presented at the desired aspect ratio via the display.

BRIEF DESCRIPTION OF THE DRAWINGS

FIG. 3A illustrates an example of presenting video content in a portrait aspect ratio, according to examples of the disclosure.

FIG. 3B illustrates an example of presenting video content in a landscape aspect ratio, according to examples of the disclosure.

FIGS. 12A-12D illustrate examples of a user interface including a scrubber according to examples of the disclosure.

FIGS. 14A-14B illustrate examples of a user interface including a scrubber according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Figure 1A:
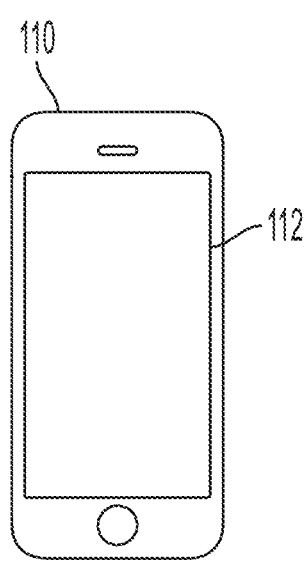
FIGS. 1A-1D illustrate an example smartphone, an example tablet, an example wearable device, and an example head-mounted device that can each include a display according to examples of the disclosure.
Figure 1B:
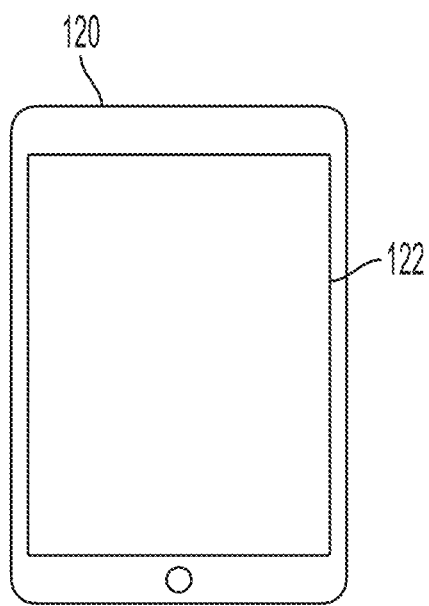
Figure 1C:
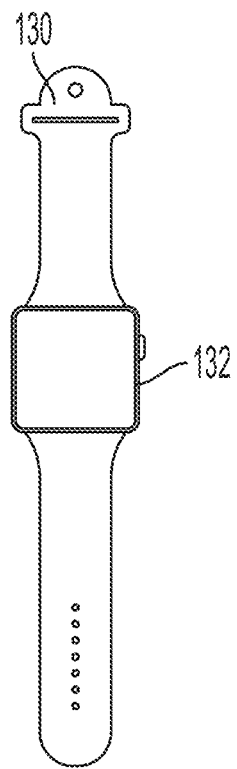
Figure 1D:
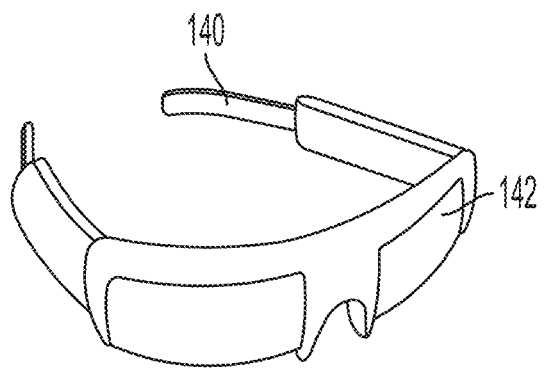

FIGS. 1A-1D illustrate examples of mobile devices including displays that can be used to present video content (which may comprise one or more video assets, as well as, in some examples, corresponding audio assets, or other assets such as assets describing haptic effects). A mobile device may include, but is not limited to, smartphones, tablets, and wearable devices. Although described with respect to mobile devices, examples of this disclosure may also be used with a television display or a computer monitor. As used herein, video can include still images, motion video (e.g., sequences of image frames), GIF files, or any other suitable visual media content. FIG. 1A illustrates an example smartphone 110 with a display 112. FIG. 1B illustrates an example tablet device 120 with a display 122. FIG. 1C illustrates an example wearable device 130 (such as a smart watch) with a display 132. FIG. 1D illustrates an example wearable head-mounted device 140 with a display 142 configured to be positioned in front of a user's eyes. In some examples, such a display can comprise a transmissive display, such as for augmented reality or mixed reality applications. In some examples, the head-mounted device can include a non-transmissive display, such as for virtual reality applications or conventional computing applications. Each of these example devices can include a respective one or more processors; one or more speakers; one or more actuators; one or more sensors, such as orientation sensors (e.g., accelerometers, gyroscopes, inertial measurement units (IMUs)), position sensors (e.g., GPS), cameras, microphones, or other suitable sensors); storage capabilities (e.g., internal volatile or non-volatile memory, or interfaces to external storage such as optical storage, solid-state storage, or magnetic storage); input or output devices; and networking capabilities, such as to send and receive data (including video data) via a network. The example devices shown in FIGS. 1A-1D can be used to implement embodiments of the disclosure.

Figure 2:
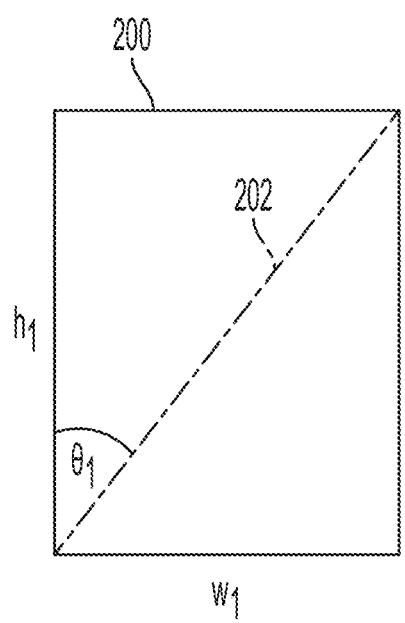
FIG. 2 illustrates a display having an aspect ratio according to examples of the disclosure.

Displays, such as those that can be included in the example devices described above with respect to FIGS. 1A-1D, can be characterized by an aspect ratio—conventionally, the ratio of the width of the display to the height of the display, although other conventions (e.g., the ratio of the height to the width, or an angle of a diagonal) can be used. FIG. 2 is illustrative. In FIG. 2, an example display 200 has a width $w_1$ and a height $h_1$; the aspect ratio can be expressed as the inverse of the slope of the diagonal line 202 (i.e., the width $w_1$ divided by the height $h_1$). Equivalently, the aspect ratio can be expressed in terms of the angle $\theta_1$ (e.g., the tangent of $\theta_1$). If the aspect ratio is less than unity (e.g., the inverse slope of 202 is less than 1, and $\theta_1$ is less than 45 degrees), the display can be described as having a "portrait" orientation. Conversely, if the aspect ratio is greater than unity (e.g., the inverse slope of 202 is greater than 1, and $\theta_1$ is greater than 45 degrees), the display can be described as having a "landscape" orientation. In some examples the angle $\theta_1$ may be selected from an angle of 1-89 degrees. As described herein, a width and height of a display can refer to horizontal and vertical dimensions, respectively, of the display with respect to a viewer (which may differ from a width and height of the device itself, if the device is rotated with respect to the viewer).

FIGS. 3A-3B illustrate examples of video content being presented on a display of a mobile device. In FIG. 3A, device 300 is oriented with its display in a portrait orientation, and is presenting video content 310A via its display. In FIG. 3B, device 300 is rotated such that its display is in a landscape orientation, and is presenting video content 310B via its display. Device 300 can be freely rotated between the portrait orientation and the landscape orientation, and the corresponding video content (310A or 310B, respectively) will be presented accordingly. Video content can be presented by a media player application executing on device 300. Once skilled in the art will understand that the device may be rotated both clockwise and counterclockwise to switch between the video content 310A and 310B.

In FIGS. 3A-3B, device 300 is shown presenting video content 310A/310B that includes a television news-style program comprising various visual elements: a host 322A/322B, which may be video footage of the host; and visual elements 320A/320B, 324A/324B, and 326A/326B, all overlaid on background 328A/328B. In addition, video content 310A/310B may be presented concurrently with a corresponding audio track (e.g., presented via speakers of device 300), or with some other type of output (e.g., haptic output). (In some cases, such audio tracks or other content may be presented without any corresponding video.) Video content 310A includes one or more video assets associated with a portrait aspect ratio to match a portrait aspect ratio of the display of device 300 in FIG. 3A. In some examples, video content 310A can comprise a single video asset that includes elements 320A, 322A, 324A, 326A, and 328A, and is formatted to a native portrait aspect ratio. In some examples, video content 310A can comprise two or more video assets. For instance, a first video asset of video content 310A could include a composite of host 322A and background 328A, with the first video asset formatted to native portrait aspect ratio; a second video asset of video content 310A could include element 320A; a third video asset of video content 310A could include element 324A; and a fourth video asset of video content 310A could include element 326A. The second, third, and fourth video assets could be considered layers, and the layers could be combined (e.g., procedurally) with the first video asset (e.g., the background and host) to generate a composite video featuring the layers arranged on top of the first video asset, with the composite video having a native portrait aspect ratio. Similarly, video content 310B includes one or more video assets associated with a landscape aspect ratio to match a landscape aspect ratio of the display of device 300 in FIG. 3B. Video content 310B can in some examples comprise a single video asset including elements 320B, 322B, 324B, 326B, and 328B, and formatted to a native landscape aspect ratio; and can in some examples include two or more video assets, such as described above with respect to video content 310A, with the video assets used to generate a composite video having a native landscape aspect ratio. Device 300 can select whether to display video content 310A (and its corresponding assets) or video content 310B (and its corresponding assets), based on an orientation of device 300, such as described below. However, video content (and corresponding video assets) that are unselected may remain resident in the memory of device 300, such that switching between video content 310A and video content 310B can occur quickly and seamlessly. Further, transition effects (e.g., dissolves, fades, screen wipes) or animations can be used when switching between video content 310A and video content 310B to further ease the transition between the two.

Figure 4A:
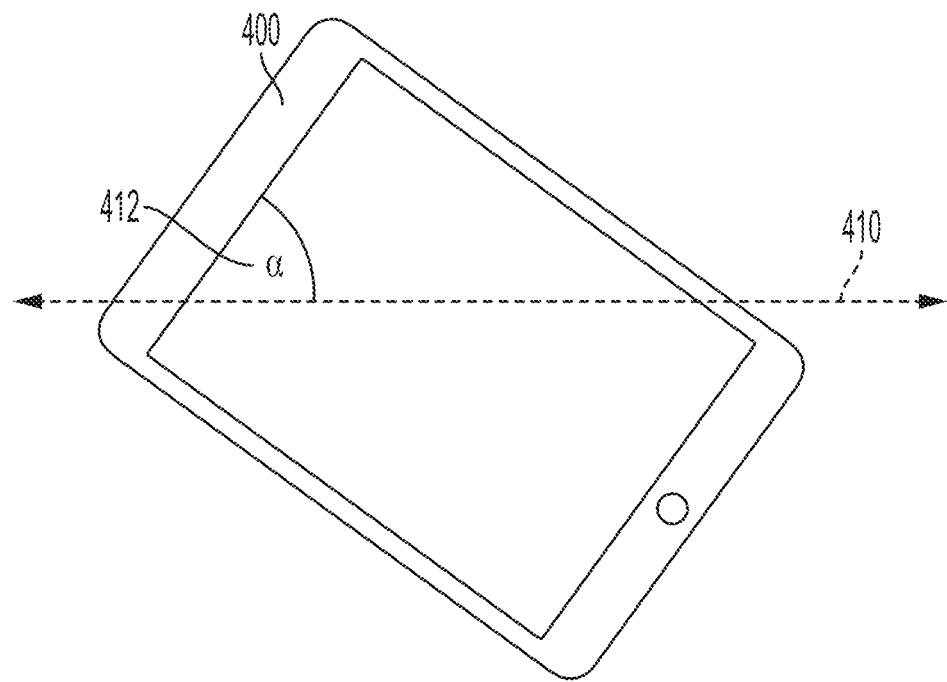
FIGS. 4A-4B illustrate examples of determining an orientation of a display according to examples of the disclosure.
Figure 4B:
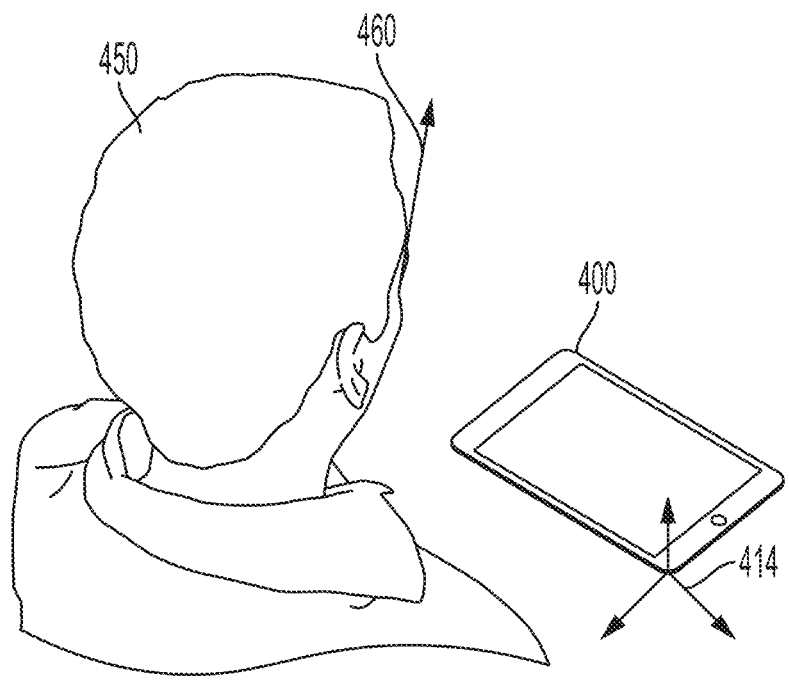

FIGS. 4A and 4B illustrate examples of determining an orientation of a mobile device 400, in order to select which video assets of a plurality of video assets should be presented on the display of the device. For instance, the determined orientation could correspond to a portrait orientation, in which case a portrait mode video asset (e.g., for video content 310A in FIG. 3A) could be selected; or the determined orientation could correspond to a landscape orientation, in which case a landscape mode video asset (e.g., for video content 310B in FIG. 3B) could be selected. Orientation of a device can be determined by detecting an output of one or more orientation sensors of the device, such as an IMU, an accelerometer, and/or a gyroscope. In some examples, such as shown in FIG. 4A, the orientation can be determined by measuring, from an orientation sensor, an angle of the display with respect to a horizontal plane in an inertial frame. For instance, in the figure, an orientation sensor can indicate that an edge of the display of device 400 lies at an angle α(412) with respect to horizon 410. In some cases, angle α can be compared to the diagonal of the display; for instance, if angle α exceeds an angle between the diagonal and an edge of the display, the device can be considered to be in landscape mode; and conversely, if angle α is less than the angle between the diagonal and the edge, the device can be considered to be in portrait mode. According to another method, angle α can be compared to one or more threshold values, and the device can be considered to be in landscape mode if the angle exceeds the threshold, and in portrait mode if it does not. Example threshold values can include 30 degrees, 45 degrees, 60 degrees, or any other suitable threshold. Moreover, hysteresis effects can be implemented via asymmetric threshold values (e.g., a threshold value of 30 degrees for transitioning from portrait mode to landscape mode, and a threshold value of 60 degrees for transitioning from landscape mode to portrait mode). In some examples, threshold values can be specified by a user of the device, or by an author of video content to be presented on the device. Other suitable methods of determining an orientation of the device will be apparent.

In some examples, such as shown in FIG. 4B, the orientation of the display can be determined with respect to an orientation of a user. For instance, in FIG. 4B, user 450 views device 400 while his or her head is oriented vertically along a vector 460 (i.e., vector 460 points upwards in the user's field of view). Vector 460 can be determined using one or more sensors of device 400, such as cameras used to track the eyes of user 450. An orientation of device 400 can be determined by comparing an inertial orientation 414 of the device (which can be determined using orientation sensors, such as described above) to vector 460. For example, an angle between vector 460 and an edge of the device 400 can be detected, and used to determine a portrait orientation or a landscape orientation using the methods described above. An advantage of this approach is that if the eyes of user 450 are positioned at an angle with respect to an inertial frame—for example, if user 450 is reclined, or lying on his or her side—the determined orientation of device 400 can take that into account. This can be desirable where, for instance, a user wishes to watch video content in portrait mode while fully reclined, even though the device may be oriented in a landscape mode with respect to an inertial frame (as might be detected by an orientation sensor such as an accelerometer).

Figure 5:
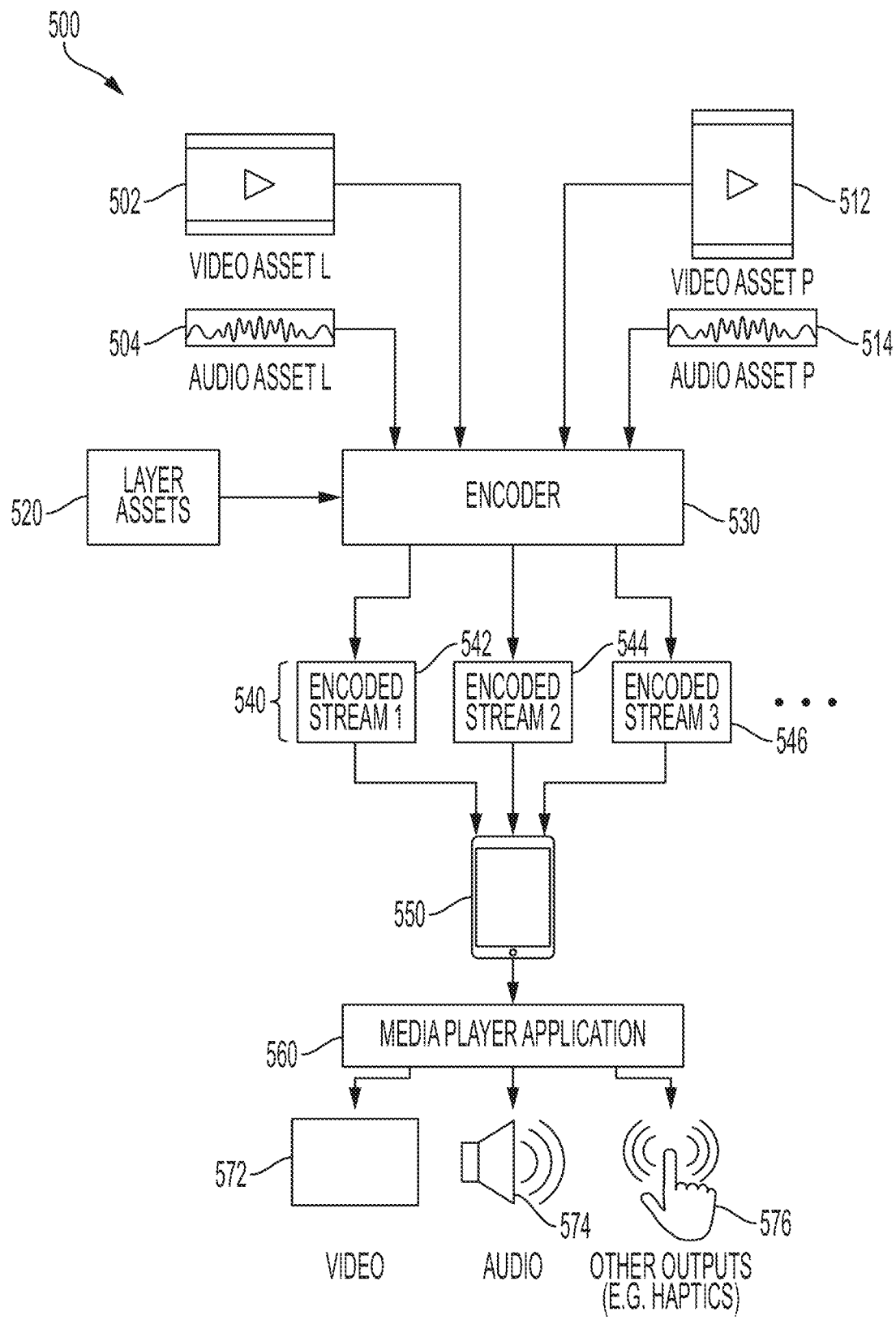
FIG. 5 illustrates an example process for encoding and presenting assets to a user via a display, according to examples of the disclosure.

FIG. 5 illustrates an example process 500 for presenting video content to a user according to embodiments of the invention. In the figure, 502 represents a first video asset (e.g., video asset "L," as in landscape), and 512 represents a second video asset (e.g., video asset "P," as in portrait). The first video asset can be associated with a first orientation (e.g., a landscape orientation), and the second video asset can be associated with a second orientation (e.g., a portrait orientation). The first and second video assets may include the same general content; for example, the first and second video assets may be different versions of a single episode of a scripted television show. While example process 500 depicts two video assets, it will be understood that the example can be extended to any suitable number of video assets.

The first and second video assets 502 and 512 can be provided by a creative entity with creative control over the video assets. The creative entity can author (e.g., produce and edit) the first video asset 502 such that it is creatively suited for presentation in the first orientation (e.g., landscape orientation); for example, the creative entity can select camera shots, control scene placement, and position graphical elements such that the video content is understandable and engaging in a landscape orientation. The creative entity can similarly author the second video asset 512 such that it is creatively suited for presentation in the second orientation (e.g., portrait orientation). Viewability differences between the first orientation and the second orientation may result in significantly different creative demands of the first video asset 502 and the second video asset 512. For example, a full-body camera shot of a standing actor may be well suited for a portrait orientation, because the proportions of an actor standing upright may resemble the proportions of a portrait display. But the same full-body shot may be inappropriate for a landscape display, whose proportions vary significantly from those of the actor. Conversely, a wide-angle camera shot of a basketball court may present well on a landscape display, but may be entirely unsuited for a portrait display. Such differences may be especially pronounced on mobile devices, which may have small screens that make it difficult for a viewer to resolve small visual details (such as facial features). Accordingly, the creative entity may elect to produce a first video asset 502 that differs (even significantly) from the second video asset 512, even though the two video assets may relate to the same general content. For example, the first and second video assets may comprise entire separate camera shots and sequences, transitions, focal points, post-processing effects, overlays, or other video elements, as appropriate. Providing separate first and second video assets, where those assets may differ creatively, offers an advantage over processes in which a single video asset is manipulated (e.g., via cropping or letterboxing) for presentation at multiple different aspect ratios. The creative entity can make human authorship decisions based on what the entity decides would look best when presented at a particular aspect ratio.

With respect to FIG. 5, 504 represents a first audio asset corresponding to the first video asset 502, and 514 represents a second audio asset corresponding to the second video asset 512. Audio asset 504 is thus associated with the first aspect ratio, and audio asset 514 is associated with the second aspect ratio. Audio assets 504 and 514 may represent audio tracks to be presented concurrently with their respective video asset. As above, while example process 500 depicts two audio assets, it will be understood that the example can be extended to any suitable number of audio assets (which may, but need not, equal the number of video assets).

In some examples, audio assets 504 and 514 may be identical assets, such as where identical audio tracks are to be presented regardless of whether a device is in a portrait orientation or a landscape orientation. In other examples, audio assets 504 and 514 may have different audio characteristics, such as a where it is desirable to present different audio tracks based on whether the device is in a portrait orientation or a landscape orientation. For instance, during a scene of a video, first video asset 502 (e.g., in landscape orientation) may feature a distant camera shot on an actor's face, while a corresponding scene in second video asset 512 (e.g., in portrait orientation) may feature a close-up camera shot on the same actor's face. It may be desirable for the actor's dialogue to be louder in the second audio asset 514 than in the first audio asset 504, to correspond with the close-up shot in portrait orientation; and for consistency with the user's expectation that sounds originating closer to the camera will be relatively louder in an audio mix than those originating farther from the camera. As with the first and second video assets described above, a creative entity can exercise creative control over the first audio asset and the second audio asset, such that the audio assets reflect human judgment of what will sound best to the listener.

With respect to FIG. 5, stage 530 represents an encoder, which comprises or executes one or more encoding processes that can encode the data of one or more assets, such that the encoded data can be presented to a device or a process (e.g., a software application) that can decode the encoded data and present it to a user. Encoder 530 can be implemented using one or more processors, which in some cases may be located on a server remote to the presentation device, or which may be implemented across a distributed computing system. In some cases, encoder 530 can perform encoding processes on an entire asset in advance of that asset's presentation to the user; in some cases, encoder 530 can perform encoding processes in real-time, while the asset is being presented to the user (as in live television). In such examples, an asset may be divided into individual units (e.g., groups of frames or samples), with encoding performed separately on each unit. The disclosure is not limited to any particular system or method for implementing encoder 530.

Encoder 530 can accept as input any suitable number of type of assets. In the example process 500 shown in FIG. 5, encoder 530 accepts as input the first video asset 502, the second video asset 512, the first audio asset 504, and the second audio asset 514, such as described above. Additionally, in some examples, encoder 530 can accept as input one or more layer assets 520, which may describe assets to be composited with other assets. For example, with respect to video content 310B in FIG. 3A described above, a first video asset 502 could include host 322B and background 328B; and layer assets 520 could include overlay elements 320B (e.g., a graphic overlay); 324B (e.g., a brand logo); and 326B (e.g., a clock). The layer assets and the first video asset could be provided as input to the encoding process 530, with the layer assets to be presented as a composite with the first video asset. In some examples, the composition could occur as part of an encoding process of the encoder 530; in some examples, layer assets 520 can be procedurally composited on a video asset by a media player application (e.g., application 560 described below). Layer assets 520 can, but need not, be associated with a particular aspect ratio.

Encoder 530 can encode its input assets according to one or more suitable processes, which may be selected depending on criteria such as network conditions (e.g., latency, available bandwidth), content type, user preferences, or display type (including display aspect ratios), such as described below. Depending on which encoding processes are used, encoder 530 can output one or more streams 540 of encoded data. For example, data streams 540 can include a first encoded data stream 542, a second encoded data stream 544, and a third encoded data stream 546 (and potentially other data streams). A data stream may correspond to any suitable combination of video data, audio data, or data associated with any other suitable type of asset (e.g., haptic data). Further, the disclosure is not limited to any particular correlation of data streams to assets (such as assets 502, 504, 512, 514, and 520 described above); a data stream can include data for any suitable number or type of assets.

Data streams 540 can be delivered to device 550, which may correspond to the example devices in FIGS. 1A-1D. In some cases, data streams 540 can be downloaded by device 550 via a computer network, such as a content delivery network (e.g., via a streaming download, or by downloading individual files). In some cases, data streams 540 can be stored on storage media (e.g., optical storage such as a DVD-ROM, solid-state storage such as a USB memory stick, or magnetic storage such as a hard drive), and read by device 550 via an interface to the storage media. A media player application 560 (e.g., a software application executing on one or more processors of device 550) can accept the encoded data streams 540 as input, and process that data (e.g., by decompressing it and setting rendering parameters) to present the underlying assets (e.g., video assets 502 and 512 and audio assets 504 and 514) to a user. For example, media player application 560 can present the video assets to the user via a display 572 of device 550; and can concurrently present audio assets to the user via speaker 574 of device 550. In some examples, media player application 560 (alone or in conjunction with one or more additional applications) can present other asset types, such as haptic assets, via device 550 (e.g., via a motor or actuator 576 of device 550). In some examples, process 500 can incorporate various interactive behaviors; for example, media player application 560 can accept user input (e.g., via an input device of device 550) relating to process 500 and respond accordingly.

In presenting the assets, media player application 560 can select between two or more presentations of video content, such as described above with respect to FIGS. 3A and 3B and video content 310A/310B. Media player application 560 can select one or more of a plurality of assets to be presented, decode the encoded data, and present the decoded data corresponding to the selected assets. In some cases, media player application 560 can identify an orientation of device 550, such as described above with respect to FIGS. 4A-4B; identify a desired aspect ratio based on that orientation; and select a video asset associated with an aspect ratio closest to that desired aspect ratio. For example, if encoded data streams 540 encode two video assets each having a different aspect ratio, media player application 560 can identify which of the two video assets has the aspect ratio closest to the desired aspect ratio, and select that video asset for presentation to the user. In selecting a video asset for presentation, media player application 560 can decode the video data of data streams 540, identify the decoded video data that corresponds to the selected video asset, and present that decoded video data while disregarding data that corresponds to the unselected video asset. Media player application 560 can similarly identify a corresponding audio asset, or other type of asset, and concurrently present that asset along with the presentation of the selected video asset. This process can be extended to any suitable number and type of assets. The process can be performed multiple times by media player application 560 during playback, for example on a frame-by-frame basis, as the user may continue to reorient device 550. This process—wherein media player application 560 selects one or more desired assets from a plurality of assets resident in memory—can carry a speed advantage over other solutions, such as selectively delivering assets to device 550; selecting a different asset for presentation need not require re-encoding an asset, or fetching the asset from a remote location, which can introduce unwanted delay and overhead. Instead, the newly selected asset is preloaded in memory and ready for immediate presentation.

Figure 6A:
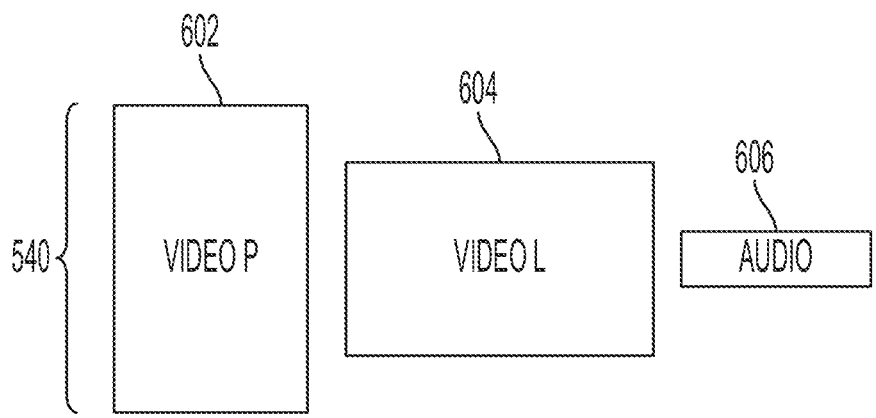
FIGS. 6A-6D illustrate examples of data streams comprising video and/or audio according to examples of the disclosure.
Figure 6B:
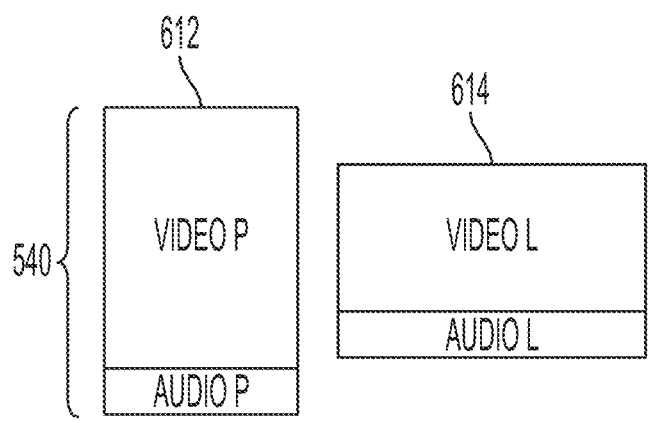
Figure 6C:
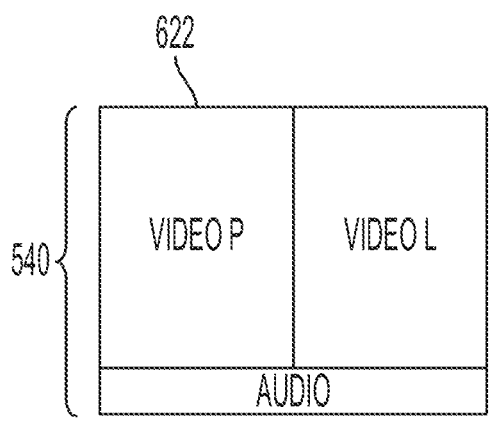

FIGS. 6A-6C illustrate examples of data streams 540. In the example shown in FIG. 6A, data streams 540 can comprise three separate streams: a first stream 602 comprising a first video asset (e.g., a video asset in a portrait orientation); a second stream 604 comprising a second video asset (e.g., a video asset in a landscape orientation); and a third stream 606 comprising an audio asset (which can be associated with both the first video asset and the second video asset). In the example shown in FIG. 6B, data streams 540 can comprise two separate streams: a first stream 612 comprising a first video asset (e.g., a video asset in a portrait orientation) and a corresponding first audio asset (e.g., an audio asset for playback on a device in a portrait orientation); and a second stream 614 comprising a second video asset (e.g., a video asset in a landscape orientation) and a corresponding second audio asset (e.g., an audio asset for playback on a device in a landscape orientation). Encoding in multiple parallel data streams may be useful, for example, to take advantage of multiple transmission paths and various streaming protocols.

In the example shown in FIG. 6C, data streams 540 comprise just a single stream 622, where stream 622 comprises a first video asset (e.g., a video asset in a portrait orientation), a second video asset (e.g., a video asset in a landscape orientation), and an audio asset (which can be associated with both the first video asset and the second video asset). In the example shown in FIG. 6D, data streams 540 comprise just a single stream 632, where stream 632 comprises a first video asset (e.g., a video asset in a portrait orientation) and a corresponding first audio asset (e.g., an audio asset for playback on a device in a portrait orientation); and a second video asset (e.g., a video asset in a landscape orientation) and a corresponding second audio asset (e.g., an audio asset for playback on a device in a landscape orientation). In each of the examples in FIG. 6A-6D, data streams 540 can be delivered to device 550, which can decode the underlying data and present it to a user as video content (e.g., video content 310A/310B described above with respect to FIGS. 3A-3B). Data streams 540 can include one or more manifest files that can include metadata relating to the contents of the data stream, and that can include various instructions or parameters for decoding and presenting those contents.

Figure 6D:
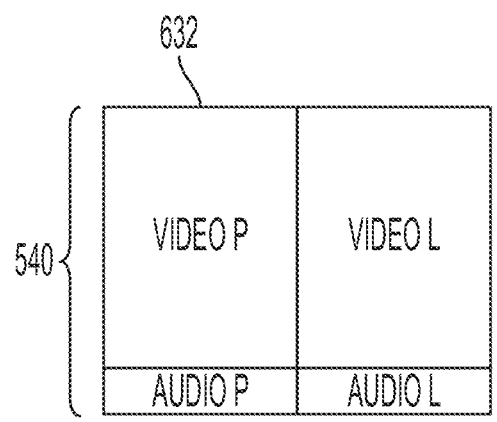

In the examples shown in FIG. 6C and 6D, multiple assets are encoded (e.g., by encoder 530) in a single data stream. This encoding can comprise interlacing the multiple assets; concatenating the multiple assets; and/or employing any other suitable technique. In some examples, encoding multiple video assets may comprise composing a video from respective time-matched frames of two or more input video assets. For example, a first frame of the composed video can comprise video data from a first frame of a first video asset alongside video data from a first frame of a second video asset. Corresponding input frames can be scaled and positioned in the composed video, such as described further below; the composed video can be encoded (e.g., on a frame-by-frame basis) by an encoder, and the encoded data delivered to device 550 as described above. Other suitable implementations are contemplated, and specific implementations of encoding multiple assets in a single data stream can vary depending on a codec used.

Data efficiencies can be realized by encoding multiple assets in a single data stream, such as data stream 622 shown in FIG. 6C or data stream 632 shown in 6D. For example, compared to delivering data in multiple streams, single stream delivery can incur less network overhead. In addition, certain video codecs (e.g., H.264) can take advantage of data redundancies, such as regions of similar or identical video content in a data stream (e.g., in composed videos such as described above), to reduce file size. Accordingly, combining data for multiple video assets in a single data stream can improve the likelihood of such redundancies being present in the data stream —particularly where, for example, two video assets present substantially similar versions of common video content—and result in greater compression ratios and overall reduced data size. Depending on the nature of the assets, the nature of device 550, user preferences, or other factors, certain encoding schemes may result in lower overall data usage or may otherwise be preferable to certain other encoding schemes. Further, in some examples, multiple encoding schemes may be used, for example to produce multiple data streams from which only a subset are delivered to device 550.

FIGS. 7A-7G illustrate various example encodings that can be used by encoder 530 to generate a data stream, such as data stream 622 or 632 described above, that includes both a first video asset and a second video asset. As described above, media player application 560 can decode the data stream, select the desired video asset from the decoded data stream, and render that video asset to a display while disregarding the unselected video asset. While not shown in FIGS. 7A-7F, audio assets or other assets may be encoded with the first and second video assets in the data streams shown in the figures. The examples shown in FIGS. 7A-7F can include composed videos, such as described above, where the composed videos comprise time-matched frames from two or more video assets; the frames are scaled and positioned in the composed video, which is encoded by encoder 530.

Figure 7A:
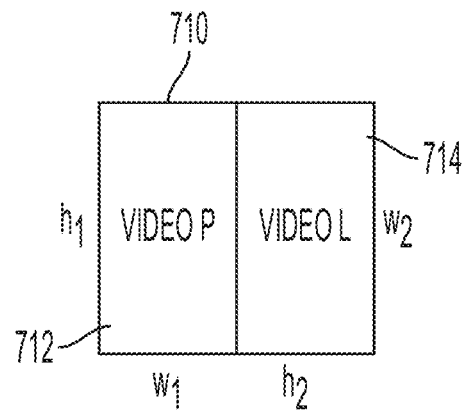
FIGS. 7A-7G illustrate examples of encoding assets comprising video according to examples of the disclosure.

In the example data stream shown in FIG. 7A, a composed video 710 comprises a first video asset 712 and a second video asset 714, where the height $h_1$ of the first video asset 712 (e.g., portrait orientation) equals the width $w_2$ of the second video asset (e.g., landscape orientation). For example, the first and second video assets may have inverse aspect ratios, such as 16:9 and 9:16. In this example, encoder 530 can generate data stream 622 by encoding a version of the second video asset 714 that is rotated 90 degrees with respect to the first video asset 712, such that the rotated asset 714 can be positioned horizontally adjacent to asset 712 as shown in the figure.

Figure 7B:
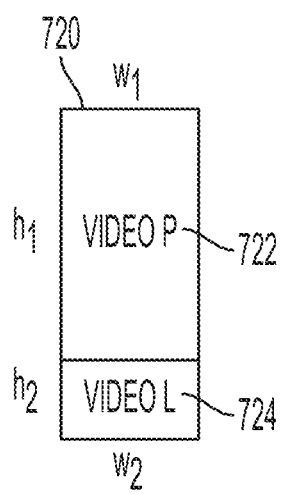

In the example data stream shown in FIG. 7B, a composed video 720 comprises a first video asset 722 and a second video asset 724, where the width $w_1$ of the first video asset 722 (e.g., portrait orientation) equals the width $w_2$ of the second video asset 724 (e.g., landscape orientation). The second video asset 724 may be scaled down from an original size, such that its width $w_2$ equals $w_1$; the overall data size of the data stream may be reduced in this configuration. In this example, encoder 530 can generate data stream 622 or 632 by positioning the first video asset 722 vertically adjacent to the second video asset 724 as shown in the figure and encoding the composed video.

Figure 7C:
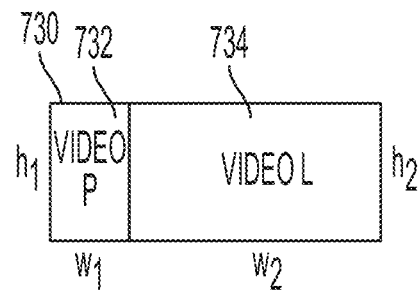

In the example data stream shown in FIG. 7C, a composed video 730 comprises a first video asset 732 and a second video asset 734, where the height $h_1$ of the first video asset 732 (e.g., portrait orientation) equals the height $h_2$ of the second video asset 734 (e.g., landscape orientation). The first video asset 732 may be scaled down from an original size, such that its width $h_1$ equals $h_2$; the overall data size of the data stream may be reduced in this configuration. In this example, encoder 530 can generate data stream 622 or 632 by positioning the first video asset 732 horizontally adjacent to the second video asset 734 as shown in the figure and encoding the composed video.

Figure 7D:
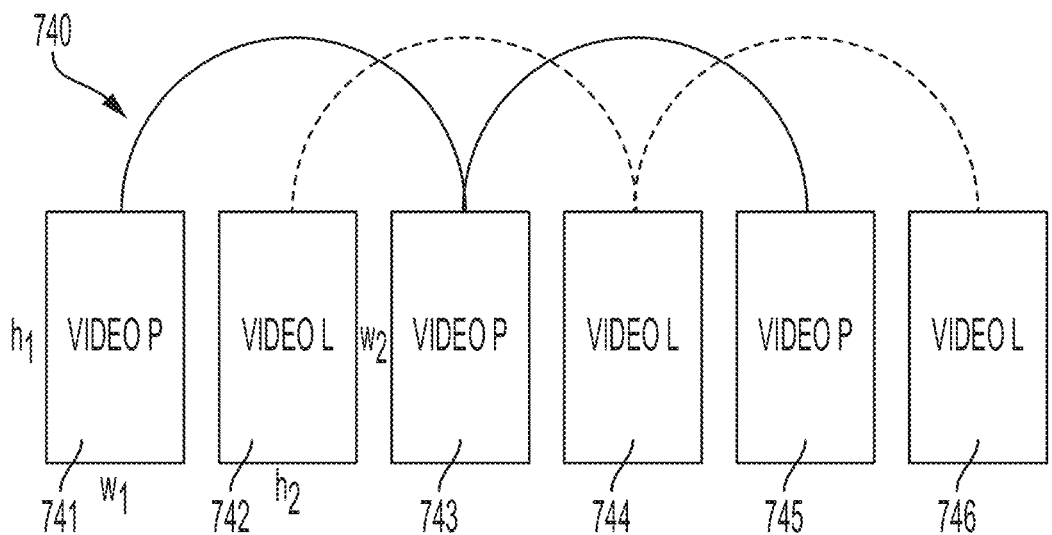

In the example data stream 740 shown in FIG. 7D, frames of a first video asset (e.g., frames 741, 743, 745 in portrait orientation) are interlaced with frames of a second video asset (e.g., frames 742, 744, 746 in landscape orientation), such that media player application 560 can present either the first video asset or the second video asset by de-interlacing the frames and presenting those frames corresponding to the desired video asset. In the example shown, frames of the second video asset can be rotated 90 degrees with respect to frames of the first video asset, for spatial consistency with frames of the first video asset.

Figure 7E:
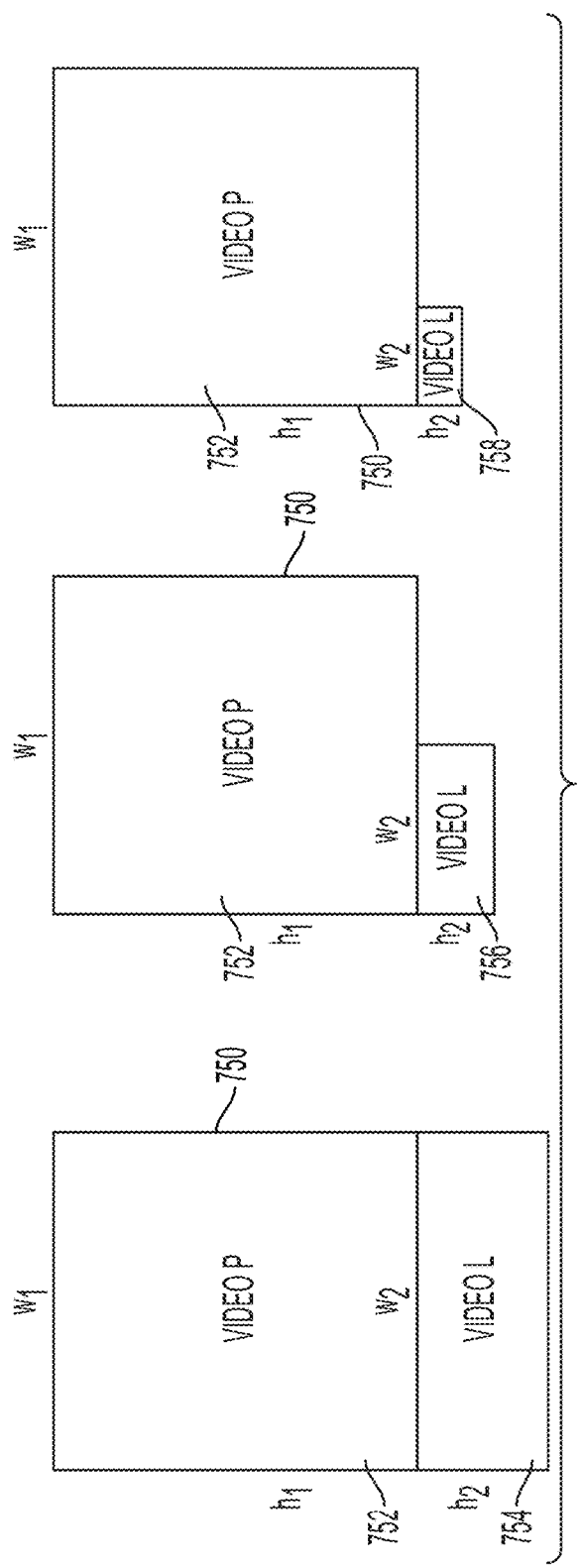
Figure 7F:
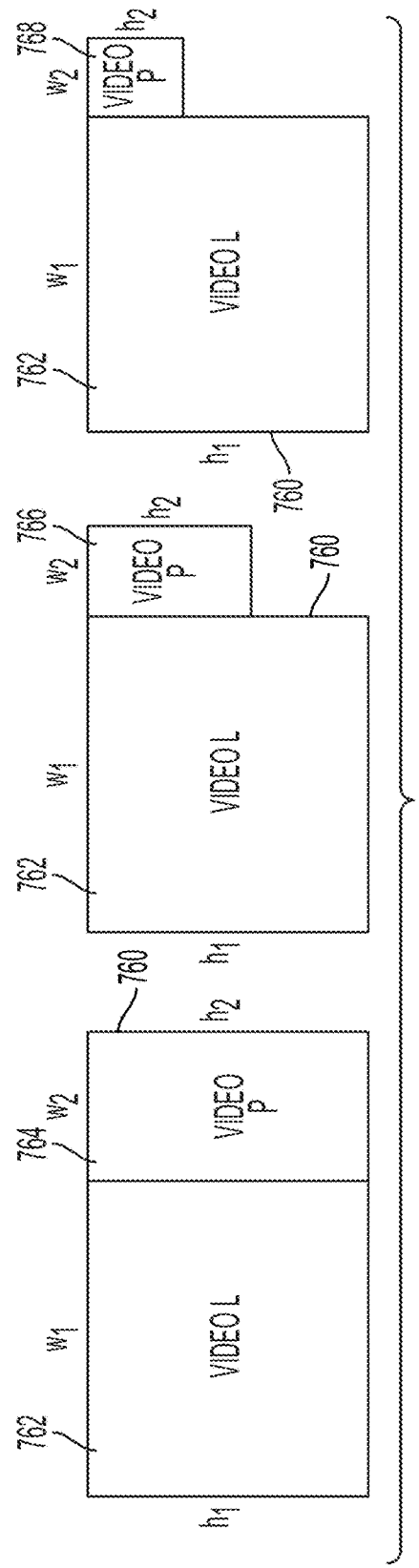

In the example data stream shown in FIG. 7E, a composed video 750 comprises a first video asset 752 and a second video asset (e.g., 754, 756, 758). The first video asset 752 (e.g., portrait orientation) can be encoded at a full size, while the second video asset can be scaled to various reduced sizes. For example, video assets 756 and 758 illustrate video assets of increasingly reduced size with respect to 754. This may be desirable if device 550 is not expected to operate in an orientation (e.g., landscape orientation) that corresponds to the second video asset; the data size of the data stream can be reduced accordingly, while still making reduced-size versions of the second video asset available to media player application 560 in the unexpected event that the device rotates such that the second video asset should be played. In some examples, such an event could be followed by providing the second video asset to device 550 at a full size (e.g., as shown in FIG. 7A). Similarly, FIG. 7F shows an example data stream featuring a composed video 760, in which the first video asset 762 is a full-size video asset in a landscape orientation, and reduced-size video assets 764, 766, and 768 are in a portrait orientation.

In the examples shown in FIGS. 6A-6D and FIGS. 7A-7F, video assets may be rotated or oriented as desired to obtain network efficiencies or meet other requirements. For example, with respect to FIG. 7A, the portrait orientation video asset 712 may be oriented at a first angle (e.g., zero degrees), while the landscape orientation video asset 714 may be oriented at a second angle (e.g., 90 degrees with respect to the first angle). Orienting a first video asset at a non-zero angle with respect to a second video asset can permit the first video asset and the second video asset to be encoded in a single frame that meets desired dimensional requirements. For example, with respect to FIG. 7A, the second video asset 714 (with width $w_2$ and height $h_2$) can be oriented at a 90 degree angle with respect to the first video asset 712 (with width $w_1$ and height $h_1$), such that the combined frame can be encoded as a rectangle with a height of $h_1$ and a width of $w_1 + h_2$. In all examples described herein and shown in the figures, it is within the scope of the disclosure that the video assets may be oriented at any suitable angle (including a zero angle) with respect to each other.

In some examples, a first video asset may be oriented at a same angle as a second video asset. This may be necessary when, for example, technical requirements demand that a video asset be encoded with a particular orientation. For instance, a video playback application may require that a video asset be oriented at a particular angle in order to present that video asset to a viewer. In some cases, DRM or other content protection mechanisms may require encoding of a video asset in a particular orientation.

Figure 7G:
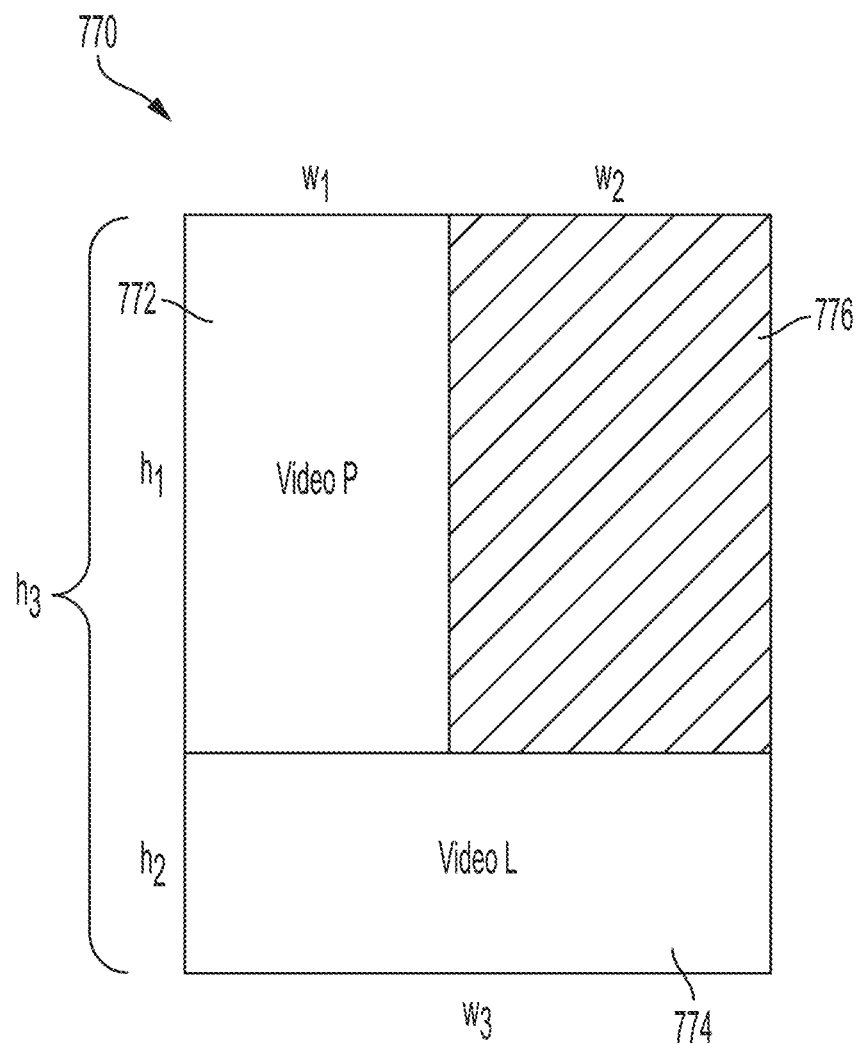

FIG. 7G shown an example data stream in which a composed video 770 comprises a first video asset 772 and a second video asset 774. In the example, second video asset 774 may be a landscape orientation video asset that is not oriented at a non-zero angle with respect to first video asset 772, a portrait orientation video asset. In the example shown, the first video asset 772 has a width $w_1$ and a height $h_1$; and the second video asset 774 has a width $w_3$ and a height $h_2$. In the example shown, the first video asset 772 and the second video asset 774 are positioned in an "L" shape, in which the first video asset 772 and the second video asset 774 share a single common boundary (in the example, the width $w_1$ of first video asset 772, which is collinear with the width $w_3$ of the second video asset 774). The first video asset 772 and the second video asset 774 need not share any common linear dimensions. For example, as shown in the figure, width $w_1$ of the first video asset 772 is shorter than width $w_3$ of the second video asset 774; and height $h_1$ of the first video asset 772 is longer than height $h_2$ of the second video asset 774. In the example, the first video asset 772 and the second video asset 774 are encoded together in a rectangular frame having height $h_3$ (i.e., $h_1 + h_2$) and width $w_3$. The lack of a common linear dimension differs from some examples shown above: for instance, in example data stream 710 in FIG. 7A, landscape orientation video asset 714 can be rotated 90 degrees to share a boundary (i.e., $w_2$ and $h_1$) coextensive with portrait orientation video asset 712. And in example data stream 720 in FIG. 7B, a resolution of landscape orientation video asset 724 can be reduced with respect to portrait orientation video asset 722 such that landscape orientation video asset 724 shares a boundary (i.e., $w_1$ and $w_2$) coextensive with portrait orientation video asset 722. Unlike these examples, the example encoding shown in FIG. 7G results in a region 776 of composed video 770 that does not belong to either the first video asset 772 or the second video asset 774. In some examples, region 776 can be used to encode additional data (e.g., one or more additional video assets); but in some examples, region 776 may be a region of unutilized space.

Certain encoding schemes, such as described above, may be more desirable than others depending on variables such as network conditions; user habits; or the type of content to be presented. In some examples, machine learning techniques (e.g., neural network techniques) or probabilistic models can be used to identify and predict which encoding scheme is preferable in a particular circumstance.

In some examples described and shown above, video assets are encoded adjacent to one another, e.g., in a data stream. In some examples, adjacent video assets may share a common pixel boundary. However, it is within the scope of this disclosure that adjacent video assets may be separated by an insubstantial region of space. For example, it is contemplated that adjacent video assets may be separated by a row or column of 1 or 2 pixels.

While the above examples are described with respect to video assets, it will be understood that aspects of the disclosure can be applied to audio-only assets (e.g., music, podcasts) that may not have a video component. Further, the disclosure can be applied to assets comprising still images, GIF files, or other suitable types of media.

Adaptive Scrubber

As described above, a user of a display device may switch between a first video asset, e.g., a video in a portrait orientation, and a second video asset, e.g., a video in a landscape orientation, by rotating the display device. In some examples a data stream may include both a first video asset and a second video asset, such as described above. Playback of a video asset can comprise a user interface with a "scrubber" element for graphically representing temporal locations of the video asset (e.g., via a position of a playback head). For example, a scrubber element can depict a video asset as a line, with a first time (e.g., the beginning) of the video asset at one end of the line, and a second time (e.g., the end) of the video asset at the other end of the line. During video playback or editing, a user can change the frame of a video, or a time corresponding to a playback position by dragging a slider or playhead across a scrubber bar or timeline. (The timeline may, but need not, be represented as a straight line.) On touch-sensitive devices, a user can manipulate the scrubber using touch controls; for example, dragging a playhead along a timeline with one's finger on a touch screen can move the playback position accordingly. On non-touch-sensitive devices, the user can manipulate the scrubber using a mouse, a remote control, a gamepad, or another suitable input device.

The usability of a scrubber can depend on various factors. For example, it is desirable that a scrubber be easily accessible (e.g., via one's dominant thumb while holding a touch screen device with the dominant hand). It is further desirable that the scrubber not overlap or obscure important information on a display screen. However, it is also desirable that the scrubber be sufficiently large to allow for fine and coarse inputs; a scrubber that is too small may frustrate a user's ability to make fine adjustments to the playhead, particular when viewing lengthy video assets. When a scrubber is used to manipulate one or multiple video assets—for example, either a portrait orientation video asset or a landscape orientation video asset, such as in the examples described above—a one-size-fits-all scrubber design may be unsuitable. For instance, a scrubber that is sufficiently large, easily accessible to the user, and does not overlap important video content when viewing a portrait orientation video may suddenly become unsuitable when the user switches to a landscape orientation video; for example, the landscape orientation video may place important information in a different location on the display, and if the user holds a mobile device in a landscape orientation, the scrubber may no longer be within easy reach of the user.

It can be desirable that a scrubber tool comprise an adaptive scrubber; that is, a scrubber whose appearance or functionality may adapt to the video asset being played, and/or to the orientation of the display device. This can be particularly desirable when a user (e.g., of a mobile display device) wishes to switch between two video modes or video assets (e.g., portrait and landscape), such as described above, and control them with a common scrubber tool. In embodiments described herein, an adaptive scrubber may adopt one or more first characteristics (e.g., appearance, display location, dimensions, functionality) when viewing a first video asset or a first video mode, and may adopt one or more second characteristics when viewing a second video asset or a second video mode. For example, a video asset corresponding to a portrait orientation may be associated with an playback interface or an adaptive scrubber having a vertically oriented layout, while a video asset corresponding to a landscape orientation may be associated with a playback interface or an adaptive scrubber having a horizontally oriented layout. In this manner, the adaptive scrubber can adopt an appearance or functionality suited to the video at hand. This may enhance ease of use of the scrubber and enhance the overall viewing experience for the user. In some examples, other aspects of video playback may adapt to the video asset being played; one example is adaptive closed captioning, where the location and/or the content of the closed captioning may differ between a first video asset and a second video asset.

Figure 9A:
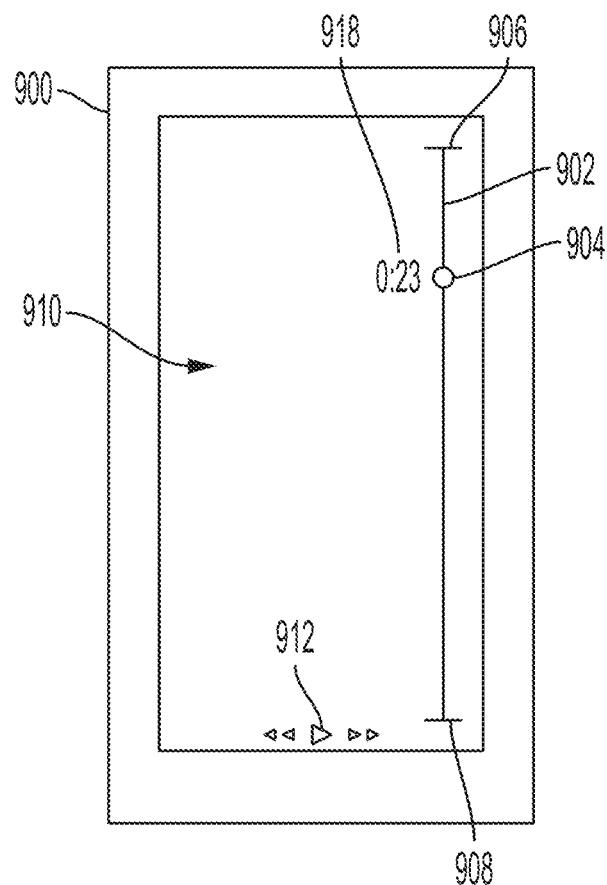
FIGS. 9A-9C illustrate examples an example layout of a user interface including a scrubber according to examples of the disclosure.
Figure 9B:
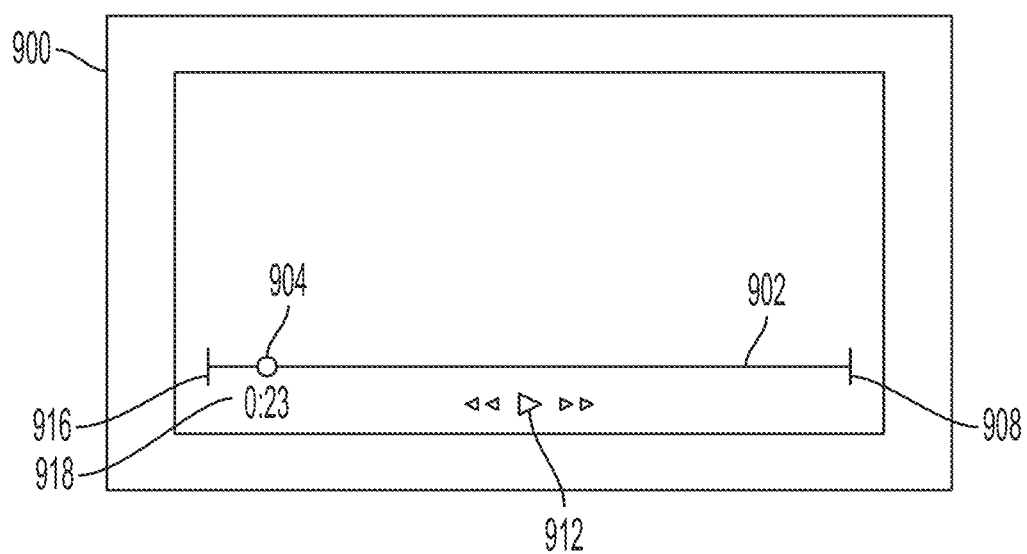
Figure 9C:
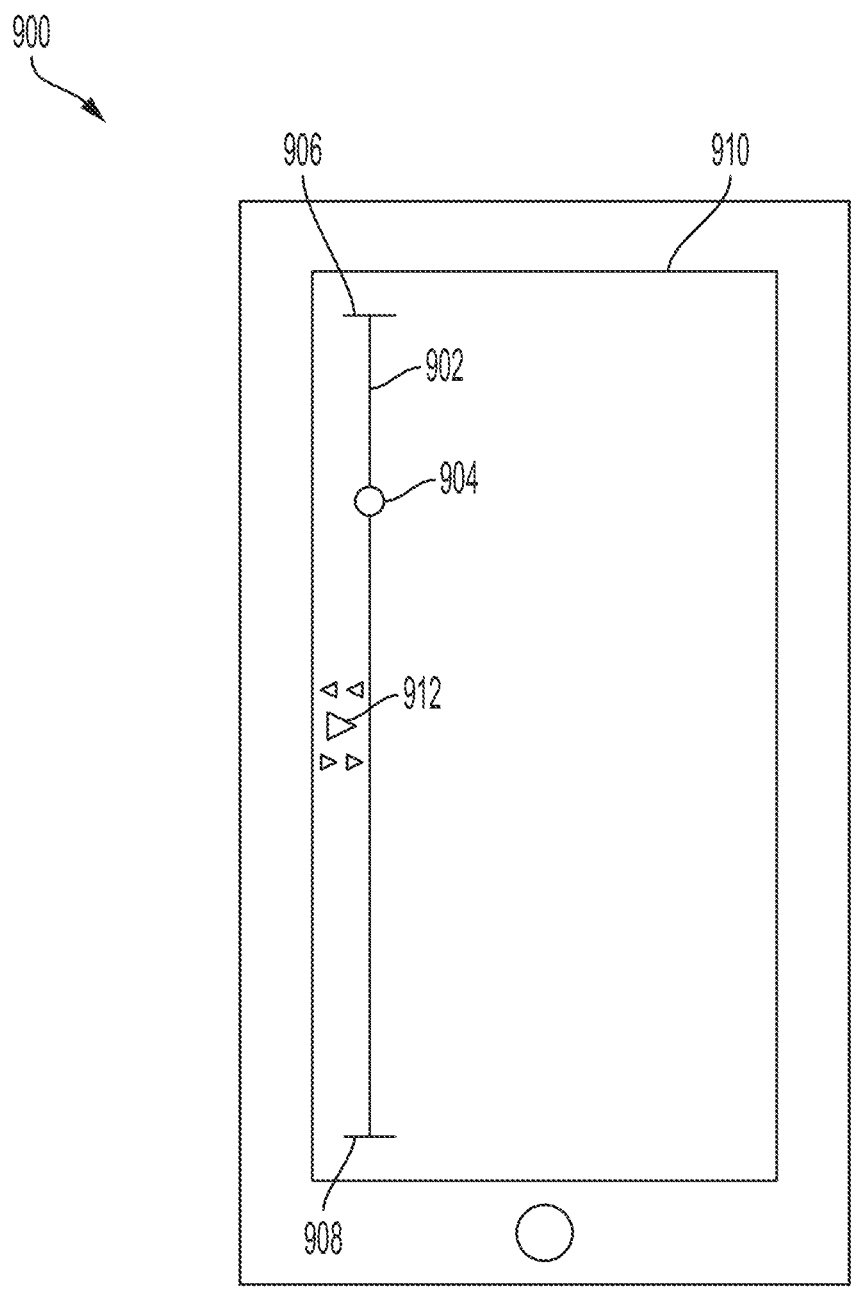

FIGS. 9A-9C illustrate examples of a user interface including an adaptive scrubber being presented on a display of a mobile device in a portrait orientation. In FIG. 9A, a device 900 displaying an adaptive scrubber 910 on a display may include a scrubber bar 902 having a start position 906 and an end position 908. The scrubber bar 902 may include a slider or playhead 904. The slider 904 may move along the scrubber bar 902 to indicate the playback time that has elapsed. For example, at the beginning of a video, the slider may be positioned along the scrubber bar 902 at the start position 906. As the video plays, the slider will move along the scrubber bar 902 corresponding to the amount of time the video has played. At the end of the video, the slider 904 can be positioned at the end position 908. In some embodiments, the slider 904 may have a timecode 918 positioned next to the slider 904. For example, as seen in FIG. 9A, the timecode 918 may be positioned to the left the slider 904. In other embodiments, the timecode may be positioned to the left, below, or above the slider 904. As the slider 904 moves along the scrubber bar 902, the timecode 918 may move with the slider to maintain the same relative position to the slider 904.

The adaptive scrubber may also include playback controls 912. The playback controls 912 may include a fast-forward, a rewind, and a play/pause icon. Selecting an icon can have a corresponding effect on the video as well as the position of the slider 904 on the scrubber bar 902. For example, selecting (e.g., clicking or tapping) the play/pause icon on the playback controls 912 may cause a playing video to pause. The slider 904 can remain in place along the scrubber bar 902 at the time the selection was made, i.e., playback of the currently displayed video asset will stop. If the play command is selected, the presented video asset will resume playing at a real time speed. Selecting the fast-forward icon on the playback controls 912 may cause the video to fast-forward, i.e., advance the current video asset at a rate quicker than real-time. The slider 904 can similarly advance along the scrubber bar 902 at a rate quicker than real-time corresponding to the video. In some embodiments, there may be more than one fast-forward speed. For example, selecting the fast-forward icon once may result in a fast-forward rate corresponding to 1.5× the speed of the original video. Selecting the fast-forward icon a second time may result in a fast-forward rate of 2.0× the speed of the original video. Selecting the fast-forward icon a third time may result in a fast-forward rate of 3.0× the speed of the original video. The rewind icon of the playback controls 912 may be used to rewind the video, i.e., present frames of the selected video asset in a reverse order starting from the current frame. The rewind icon may have multiple speeds as described with respect to the fast-forward icon.

The user interface elements associated with the adaptive scrubber may be positioned based on the video asset currently being played by the device, e.g., may depend on the orientation of the device. In FIG. 9A, the device 900 is oriented in with its display in portrait orientation, which may correspond to a first video asset presenting video content on the display in a vertical layout. While the device has a portrait orientation and is playing the first video asset, the adaptive scrubber 910 may have a corresponding vertical layout on the display such that the length of the scrubber bar 902A is parallel to the longest side of the device 900. A user may rotate the device such that the device 900 is oriented with its display in a landscape orientation, which may trigger the device to play a second video asset presenting video content with a horizontal layout, as shown in FIG. 9B. The scrubber bar 902B is similarly rotated to have a corresponding horizontal layout such that the scrubber bar 902B is parallel to the longest side of the device 900. Device 900 can be freely rotated between the portrait orientation and the landscape orientation, and the adaptive scrubber 910 will be presented accordingly.

Referring to both FIGS. 9A and 9B, rotating the device between the first video asset, e.g., portrait orientation, and the second video asset, e.g., landscape orientation, may affect the position or orientation of user interface elements of the adaptive scrubber. These can include the timecode 918 and playback controls 912, and additional user interface elements described below (e.g., FIGS. 12A-12D, and 13A-13D). For example, in FIG. 9A, the device 900 is playing a the first video asset in portrait orientation such that the scrubber bar 902 is on the right side of the display and the time code 918 is positioned to the left of the slider 904 on the scrubber bar 902. When the device 900 is rotated to the orientation shown in FIG. 9B, the device may play the second video asset in landscape orientation such that the scrubber bar 902 is positioned at the bottom of the display and the time code 918 is positioned below the slider 904 on the scrubber bar 902. In some examples, when the second video asset (e.g., landscape orientation) is playing, the time code may be positioned above the slider.

Referring to FIGS. 9B-9C, the playback controls 912 may similarly change position depending on an orientation of the display device (e.g., portrait or landscape), which may correspond to the video asset being presented, such as described above. For example, in FIG. 9B, the device 900 is playing a second video asset in landscape orientation with the playback controls 912 positioned at the bottom of the display. According to some examples, when the device 900 is rotated to the orientation shown in FIG. 9C, the device may play the first video asset in portrait orientation, such that the playback controls 912 are positioned to the left of the scrubber bar 902 in a vertical configuration.

With respect to FIG. 9A, while the device 900 is showing the first video asset in a portrait orientation, the adaptive scrubber 910A may have a vertical layout on the display such that the scrubber bar 902A is located on a right side of the display. This layout may be preferable if the user is right-hand dominant. Referring to FIG. 9C, while the device 900 is showing the first video asset in a portrait orientation, the adaptive scrubber 910C may have a vertical layout on the display such that the scrubber bar 902C is located on a left side of the display. This layout may be preferable if the user is left-hand dominant. According to some examples, a user may indicate a preference for having the scrubber bar located on either the right or left side of the display.

According to some examples, a handheld device may detect a location of a hand of the user grasping the device to automatically determine which side of the screen to position the scrubber bar. In FIG. 10A, the device 1000 may detect that a left hand 1016A of the user is grasping the device and position the scrubber bar 1002 on the left side of the display of the device 1000. This may allow a user to manipulate the position of the slider 1004 and playback controls 1012 with the thumb of the left hand 1016A. For example, there may be sensors in the device 1000 that can detect the left hand 1016A is holding the phone. In some examples, the angle or orientation of the device 1000 may be used to determine which hand is grasping the phone. According to some examples, if the device 1000 detects that a left hand of the user is grasping the device, the scrubber bar may be positioned on the right side of the display of the device. For example, a user may prefer to grasp the device with their right hand and manipulate the adaptive scrubber with the left hand.

Figure 10B:
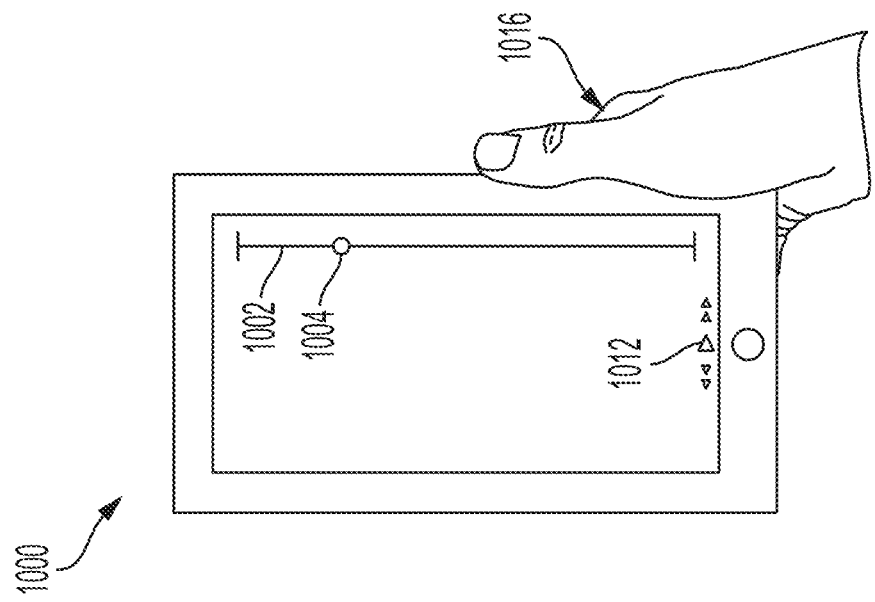
FIGS. 10A-10B illustrate examples of a user interface including a scrubber according to examples of the disclosure.
Figure 10A:
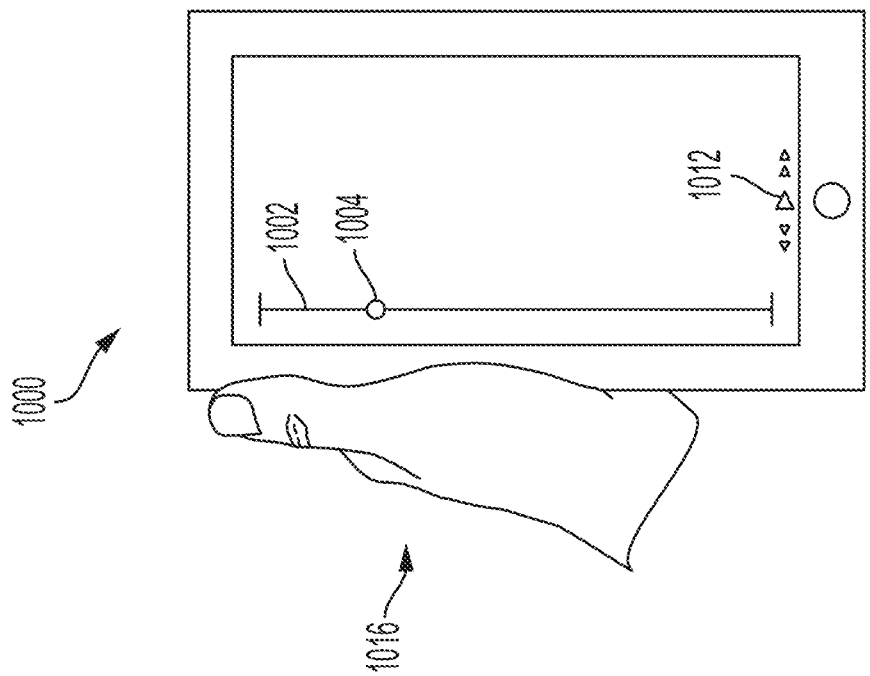

In FIG. 10B, the device 1000 may detect that a right hand 1016B of the user is grasping the device and position the scrubber bar 1002 on the right side of the display of the device 1000. This may allow a user to manipulate the position of the slider 1004 and playback controls 1012 with the thumb of the right hand 1016B. According to some examples, if the device detects that a right hand of the user is grasping the device, the scrubber bar may be positioned on the left side of the display of the device. For example, a user may prefer to grasp the device with a right hand of the user and manipulate the adaptive scrubber with the left hand.

In some examples, locations of the adaptive scrubber user interface elements, e.g., scrubber bar, slider, and playback controls may depend on the content of the video asset being played. For example, the adaptive scrubber user interface elements may be presented in areas of the display that do not correspond to, or overlap with, a focal region of the video asset. A focal region may be a region of interest, such as an area of the screen that a creative entity would expect a user's gaze to be directed. For example, the focal region for a video may correspond to an area where a person is delivering dialogue. Referring back to FIG. 3A, the video content 310A includes a television news-style program with the host 322A positioned near the right-side of the display. In this example, the focal region may correspond to the location of the host 322A. An adaptive scrubber according to this example may be presented on the left-side of the display to avoid obstructing the focal region with visual elements 320A and 324A could be repositioned accordingly. Another example of a focal region may include a region where there is relative movement of the same object between frames of the video asset, e.g., an explosion or water running in a river. This concept of positioning the adaptive scrubber in regions other than the focal region may also apply to adaptive closed captioning. In some examples, focal regions may be determined autonomously, such as by a playback application; for instance, face detection techniques could be used to identify an actor's face as a focal region. In some examples, one or more focal regions can be manually inserted, such as by a film director, or by an end user. Focal region data can be included in metadata associated with a corresponding video asset. In some cases, focal regions may change location over the length of a video, with the adaptive scrubber being continually repositioned throughout the video to avoid overlapping with the focal regions.

Figure 11A:
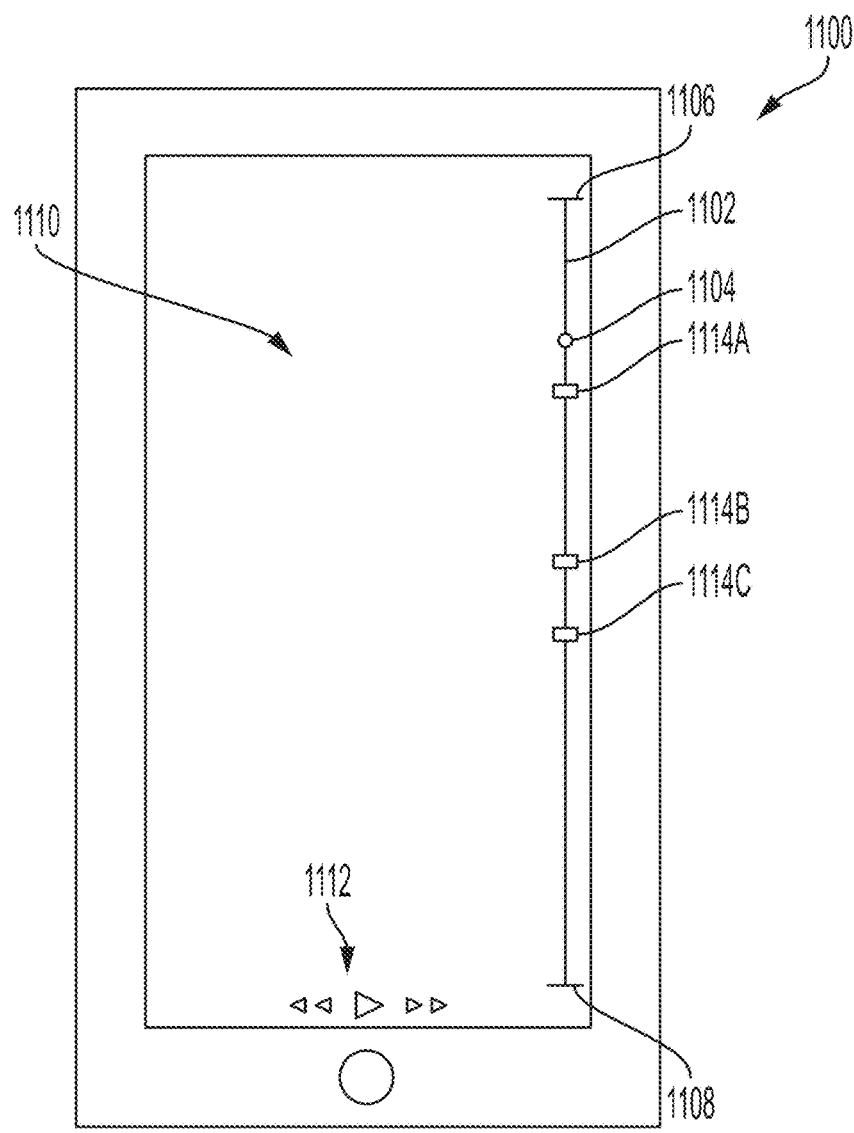
FIGS. 11A-11B illustrate examples of a user interface including a scrubber according to examples of the disclosure.
Figure 11B:
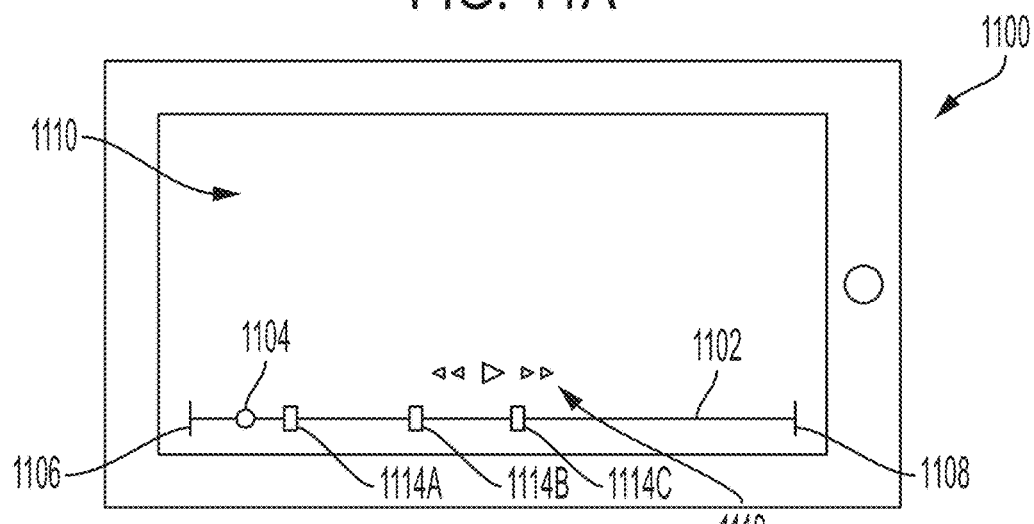

FIGS. 11A-11B illustrate an example adaptive scrubber layout that includes chapter heads 1114A, 1114B, and 1114C, positioned along the scrubber bar 1102. The device 1100 is in a portrait orientation and displaying a first video asset (e.g., video in a portrait orientation) and a corresponding adaptive scrubber 1110 with a vertical layout. The location of the chapter heads, 1114A, 1114B, and 1114C, along the scrubber bar 1102 corresponds to the time at the start of the respective chapter. For example, the adaptive scrubber illustrated in FIG. 11A includes four chapters: a chapter starting at the start position 1106, a second chapter starting at chapter head 1114A, a third chapter starting at a chapter head 1114B, and a fourth chapter starting at 1114C. In other examples, there may be more or less than four chapters in a video. In some examples, a title of the chapter may display next to the chapter head when hovering over the chapter head with a finger, stylus, or other pointer device. The chapter head icon, e.g., 1114A-1114C may be rectangular, oval, circular, triangular, or any shape that a user may easily recognize without confusing the chapter head for the slider. In some examples, the chapter head may be the same shape as the slider 1104, but be a different color. In some examples, the start position 1106 may include a chapter head icon.

Rotating the device 1100 from a portrait orientation in FIG. 11A to a landscape orientation in FIG. 11B may result in the video asset switching from a first video asset to the second video asset, such as described above. For example, in FIG. 11B, the device 1100 is in landscape orientation displaying a second video asset (e.g., landscape orientation) with the adaptive scrubber 1110 oriented horizontally. The adaptive scrubber 1110 includes chapters 1114A, 1114B, and 1114C located along a horizontally oriented scrubber bar 1102.

The chapters may indicate different sections of the video asset. According to one example, if the video is a news show, the chapters may correspond to different news segments. According to another example, if the video is a movie, the chapters may correspond to shorter narrative arcs within the movie and/or suggest a recommended location for a viewer to pause while watching the video. In some examples a creative entity and/or distributor of the content may determine the placement of the chapters. In some examples, a user may create their own chapters, as described below with respect to bookmarking and FIGS. 13A-13D.

In some examples, a first video asset, e.g., having a portrait orientation, may be different a second video asset, e.g., having a landscape orientation, as described above, e.g., FIGS. 3A-3B). Likewise, in some examples, the adaptive scrubber corresponding to the first video asset may be different than the adaptive scrubber corresponding to the second video asset. For example, the chapter locations may between the first and second video asset may correspond to different times along the scrubber bar to complement differences between the first and second video assets. In some examples, the adaptive scrubber corresponding to a first video asset may have a different number of chapters than the adaptive scrubber corresponding to a second video asset.

Figure 12D:
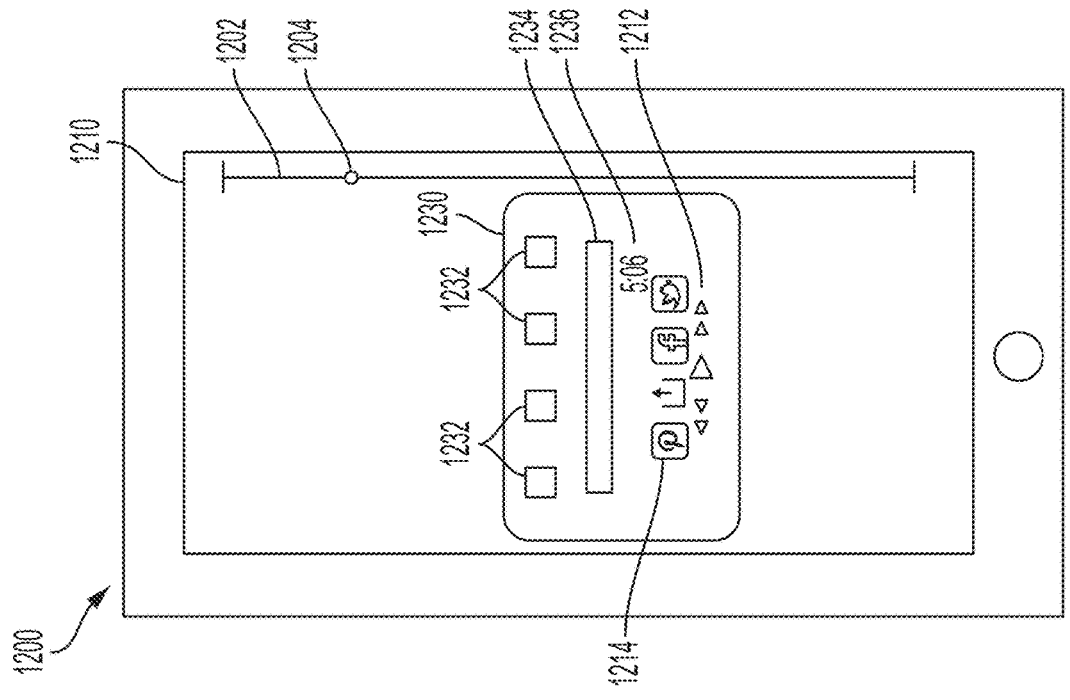

FIGS. 12A-12D illustrate examples of an adaptive scrubber 1210 layout that includes social media and sharing capabilities. In FIG. 12A, a device 1200 displays a first video asset in a portrait orientation and a corresponding adaptive scrubber 1210 oriented vertically, including a scrubber bar 1202 having a start position 1206 and an end position 1208. The scrubber bar 1202 may include a slider or playhead 1204. The slider 1204 may move along the scrubber bar 1202 to indicate the playback time that has elapsed. The adaptive scrubber may also include playback controls 1212. The playback controls 1212 may include a fast-forward, a rewind, and a play/pause icon. The adaptive scrubber 1210 may also include a plurality of social media icons or virtual buttons 1216 that may be associated with, for example, a social networking platform (e.g., Facebook, Pinterest, Twitter, Tumblr, etc.), or a messaging service (e.g., SMS text, WhatsApp). As shown in FIG. 12A, the plurality of social media icons 1216 may be positioned near the playback controls 1212 at the bottom of the display. In some examples, the social media icons may be arranged vertically to the right or left of the vertically oriented adaptive scrubber. When the device 1200 is rotated, for example from the portrait orientation illustrated in FIG. 12A to the landscape orientation illustrated in FIG. 12B, such as described above, the adaptive scrubber 1210 may similarly transition (e.g., rotate) to be oriented horizontally. For example, in FIG. 12B, the scrubber bar 1204 is located near the bottom of the display with the playback controls 1212 and social media icons 1216 positioned beneath the scrubber bar 1204. In some examples, the social media icons may be positioned above the scrubber bar 1204.

Figure 12C:
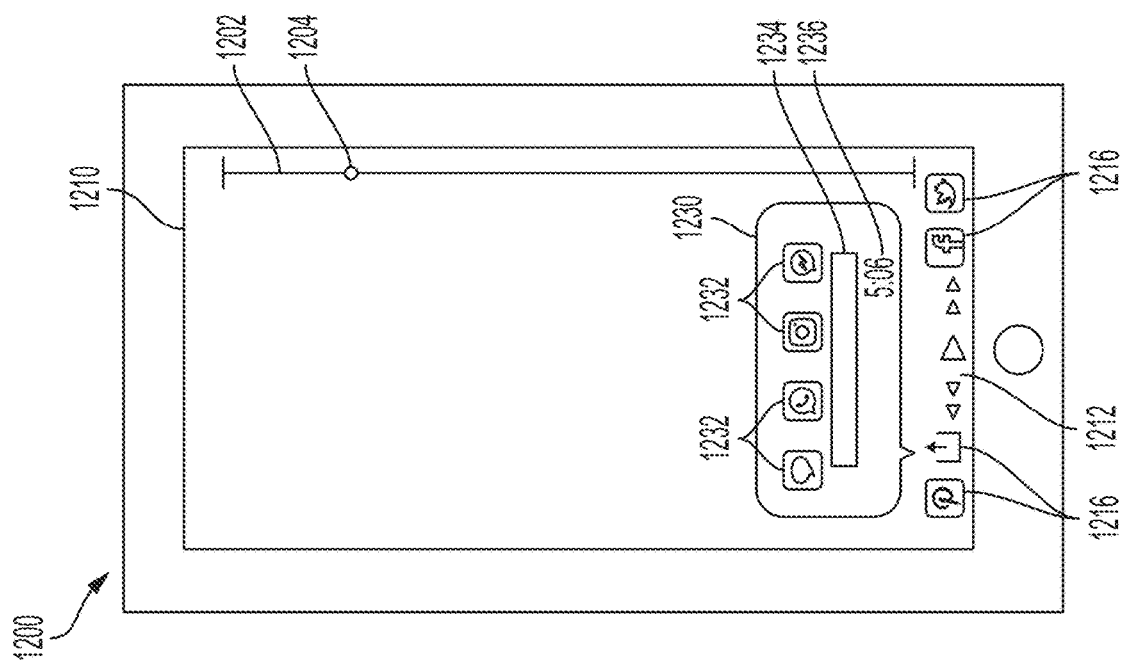

A user that desires to share a link to the video asset on playing on a device 1200 may select one of the social media icons 1216. Referring to FIG. 12C, in one example, a user may select a share icon. A pop-up 1230 may appear on the screen corresponding to options associated with the share icon 1216C. For example, the pop-up 1230C may include one or more messaging or social media icons 1232 that correspond to a messaging or social networking app or service (e.g., SMS text, WhatsApp, Instagram, etc.) that can be used to share the video asset link. The pop-up 1230 may also include a dialog box 1234 where a user can identify a recipient (e.g., a user of a social networking platform) and/or type a message to the recipient. The pop-up 1230 may also include a timer 1236 corresponding to the current playback time of the video. In this manner, a user may send a link to an exact location in the playback of the video. The user may use the playback controls 1212 to change the location in the video to send to the intended recipient. In some examples the user may prefer to send a link to the video from the beginning, without specifying a time, and may de-select the timer to do so. FIG. 12D shows an alternate layout for the pop-up 1230D. Pop-up 1230D may, for example, include the playback controls 1212D located in the pop-up 1230D near the messaging icons 1232 for ease of use.

The content of the pop-up can be tailored to the social media icon selected. For example, if a user selects the Facebook icon, the user may be given the option to post on their personal wall, a friend's wall, or send the link over Facebook Messenger. In some examples, the link sent through the social media capabilities may require the intended recipient to watch the same video asset that the user was watching before sending the link. For instance, if the user is watching a first video asset in portrait orientation and sends a link, the intended recipient can receive a link to the same video asset, e.g., to watch the video in portrait orientation. In this manner, the user can ensure that the intended recipient will have a similar experience with the video content by watching the video in the same orientation. In other examples, the intended recipient may have an option to watch the same or a different video asset. For example, an intended recipient may receive a link to both video assets and depending on the detected orientation of the device, the appropriate video asset will play, e.g., if the device is in a portrait orientation, the video asset corresponding to the portrait orientation will play. In this example, a user may rotate the device during playback and the video asset should switch accordingly, e.g., from a first video asset in portrait orientation to a second video asset in landscape orientation. In some examples where an intended recipient can choose to watch the first or second video asset, the message accompanying the link may suggest a preferred orientation.

Figure 13A:
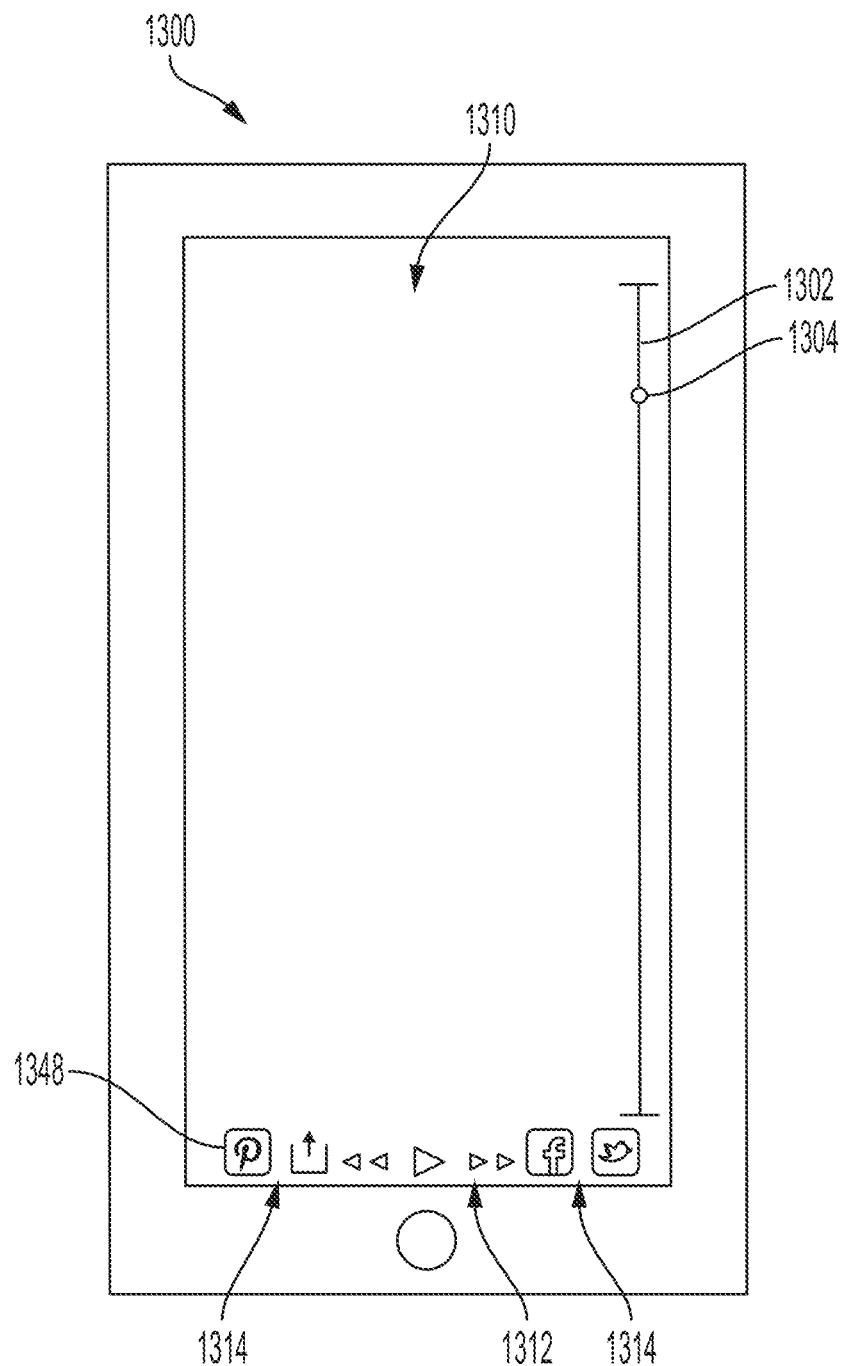
FIGS. 13A-13D illustrate examples of a user interface including a scrubber according to examples of the disclosure.

FIGS. 13A-13D illustrate an example adaptive scrubber 1310 layout that includes bookmarking capabilities. In FIG. 13A, a device 1300 displays a first video asset in portrait orientation and a corresponding adaptive scrubber 1310 oriented vertically, including a scrubber bar 1302 having a start position 1306 and an end position 1308. The scrubber bar 1302 may include a slider or playhead 1304. The slider 1304 may move along the scrubber bar 1302 to indicate the playback time that has elapsed. The adaptive scrubber may also include playback controls 1312. The playback controls 1312 may include a fast-forward, a rewind, and a play/pause icon. The playback controls may be arranged as described with respect to FIGS. 9A or 9C. The adaptive scrubber 1310 may also include a plurality of social media icons or virtual buttons 1316. The social media icons may include, for example, Facebook, Pinterest, Twitter, Tumblr, and the like. The adaptive scrubber 1310 may also include a bookmarking icon 1348. As shown in FIG. 13A, the bookmarking icon 1348 may be positioned near the plurality of social media icons 1316 with the playback controls 1312 at the bottom of the display. The bookmarking icon may be located in other areas, for example near the start position 1306, the end position 1308, or the slider 1304. As a user rotates the device 1300 from portrait orientation to landscape orientation, the adaptive scrubber user interface elements including, but not limited to, the scrubber bar 1302, slider 1304, playback controls 1312, social media icons 1316, and bookmarking icon 1348 may change position as described above (e.g., FIGS. 12A and 12B).

Figure 13C:
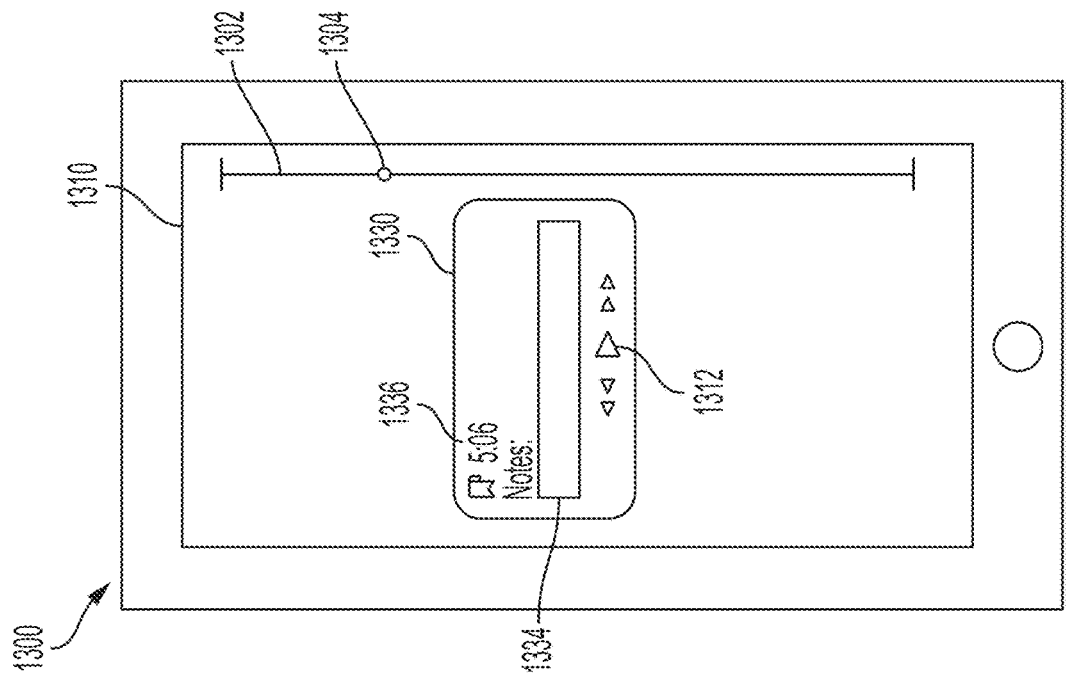
Figure 13B:
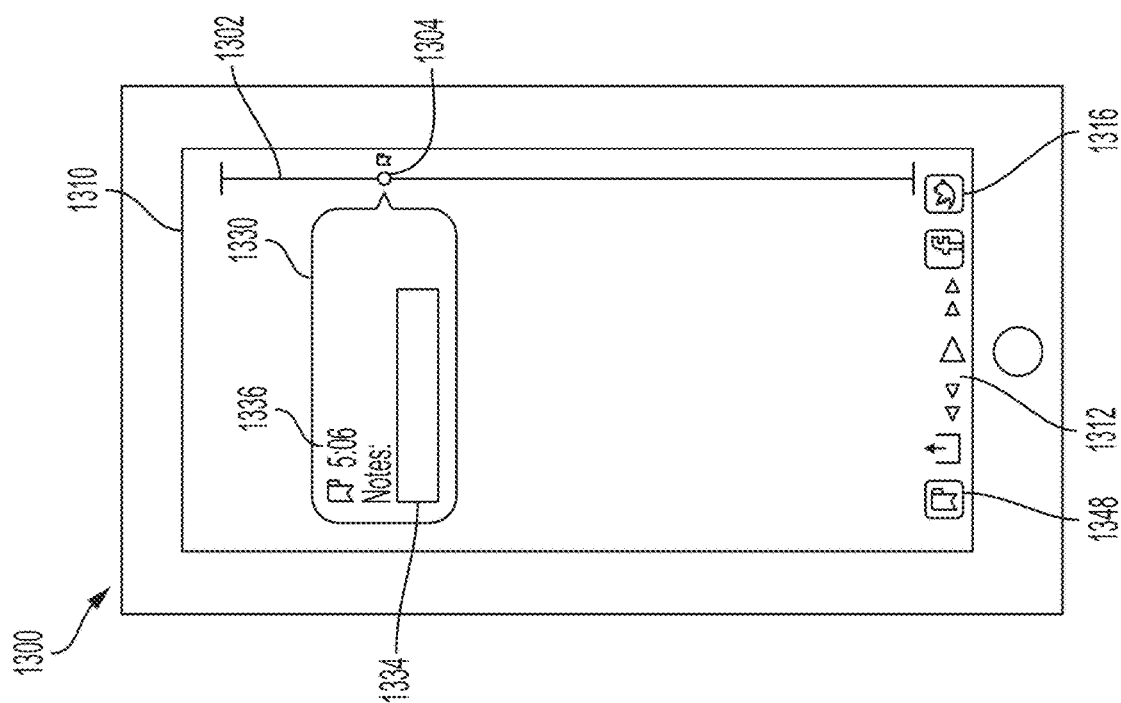

A user that desires to bookmark a start of a video segment along the scrubber bar 1302 may select the bookmarking icon 1348. Referring to FIG. 13B, in one example, selecting the bookmarking icon 1348 may cause a pop-up 1330B to appear. As seen in FIG. 13B, the pop-up 1330B may be positioned adjacent to the slider 1304. The pop-up 1330B may include a dialog box 1334B where a user can type a note or comment about the bookmark. The pop-up 1330B may include a timer 1436B corresponding to the current playback time of the video. The user may use the playback controls 1312 to change a location along the scrubber bar 1302, so that the user may bookmark the precise time in the video. FIG. 13C shows an alternate layout for the pop-up 1330C. Pop-up 1330C may, for example, include the playback controls 1312C located in the pop-up 1330C for ease of use.

Figure 13D:
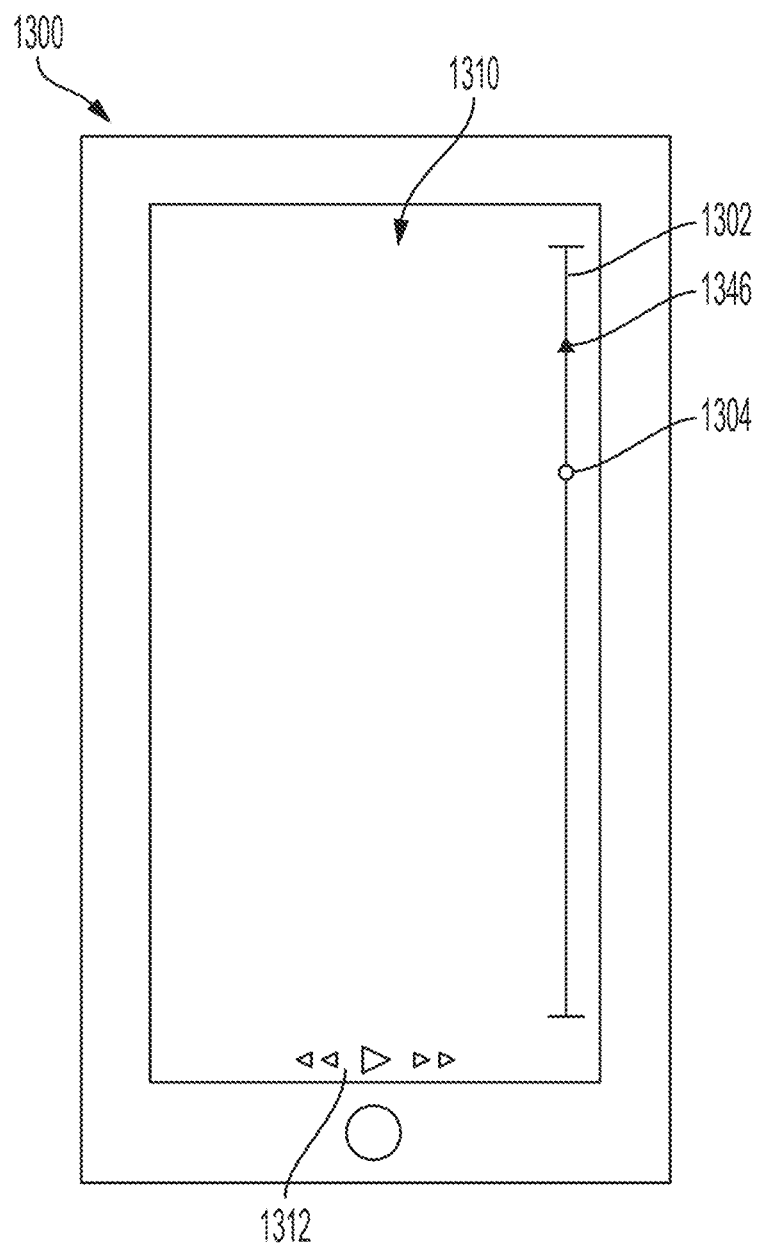

Referring to FIG. 13D, once a bookmark has been saved, bookmark icon 1346D may appear, corresponding to the location of the bookmark along the scrubber bar 1302D. In some examples, bookmarks may be saved with respect to a particular video asset. For example, if a user is watching a first video asset and saves a bookmark while in the first video asset, then the bookmark may be saved to the first video asset and not the second. In this example, the bookmark would not appear on the scrubber bar corresponding to the second video asset. In some examples, if the user is watching the second video asset (e.g., in landscape orientation) and changes the orientation of the device (e.g., to portrait orientation) for ease of typing or other reasons while saving the bookmark, the bookmark may be saved to the second video asset. In this example, the bookmark would not appear on the scrubber bar corresponding to the first video asset. In some examples, bookmarks saved by the user will save to both the first video asset and the second video asset, e.g., horizontal and vertical orientations of the adaptive scrubber.

In some examples, the bookmark icon 1346 may be rectangular, oval, circular, triangular, or any shape that a user may easily recognize without confusing the bookmark icon 1346 for a chapter head or the slider 1304. In some examples, the bookmark icon may be the same shape as the chapter head or slider, but be a different color. In some examples, the bookmarks may have a similar function as chapters and use the same icon as a chapter head. In some examples, a user may have an option to designate a selected time location as a bookmark or a chapter. In some examples, there may be a bookmarking icon as well as a separate chapter icon. In such examples, the chapter icon may work as described above with respect to the bookmarking icon. One skilled in the art would understand that a user may save multiple bookmarks for a video asset.

According to some examples, the adaptive scrubber may include a movable scrubber bar. FIGS. 14A-14B illustrate examples of a movable scrubber bar 1402. For example, FIG. 14A illustrates a device 1400 displaying a first video asset in a portrait orientation with the scrubber bar 1402 of adaptive scrubber 1410 positioned vertically at a first position on the right side of the display. The device 1400 may detect a first location of touch 1420A by the user along the scrubber bar 1402. The user may drag the scrubber bar 1402 to a second position on the display by moving the first location of touch 1420A to a second location of touch 1420B, as shown in FIG. 14B. In order to avoid equating errant touches and contact with the scrubber bar as drag commands, the device may require that the first location of touch 1420A be maintained for a predetermined amount of time, e.g., two seconds, and/or that the user apply a predetermined amount of pressure before the scrubber bar 1402 can be dragged.

While the user can move the location of touch in both a horizontal and vertical direction, the movement of the scrubber bar will track the horizontal position of the location of touch. In other words, according to this example, moving the scrubber bar will not change its vertical position.

In some examples, the scrubber bar 1402 may stay put once the scrubber bar has been dragged to a new location. For example, referring to FIG. 14B, a user may drag the scrubber bar 1402 to a second position corresponding to the second location of touch 1420B. Once the user removes a finger or stylus from the device, the scrubber bar 1402 can remain in the second position. According to some examples, the playback controls may automatically move to avoid overlap between the scrubber bar 1402 and the location of the playback controls 1412. For example, referring to FIG. 14B, the playback controls 1412 may be off-centered to the left side of the device 1400 instead of centered on the centerline 1422 of the device. In some examples, a button of the playback controls may be located on a right side of the scrubber bar while the remaining buttons may be located on a left side of the scrubber bar. For example, the rewind and play icons may be to the left of the scrubber bar while the fast-forward icon may be to the right of the scrubber bar. In some examples, the playback controls may remain in the original location despite the overlap.

In some examples, the scrubber bar 1402 may snap to a location depending on the final location of touch (e.g., the location of touch preceding the user removing a finger or stylus from the screen). For example, still referring to FIG. 14B, the second location of touch is to the right of the centerline 1422 of the device 1400, thus, the scrubber bar 1402 may snap back to the right side of the display of the device 1400. In other words, the adaptive scrubber 1401 will have the same position that it started with in FIG. 14A. According to another example, if the second location of touch was to the left of the centerline 1422, the scrubber bar 1402 would snap to the left side of the display device 1400, e.g., as illustrated in FIG. 9C.

Figure 15A:
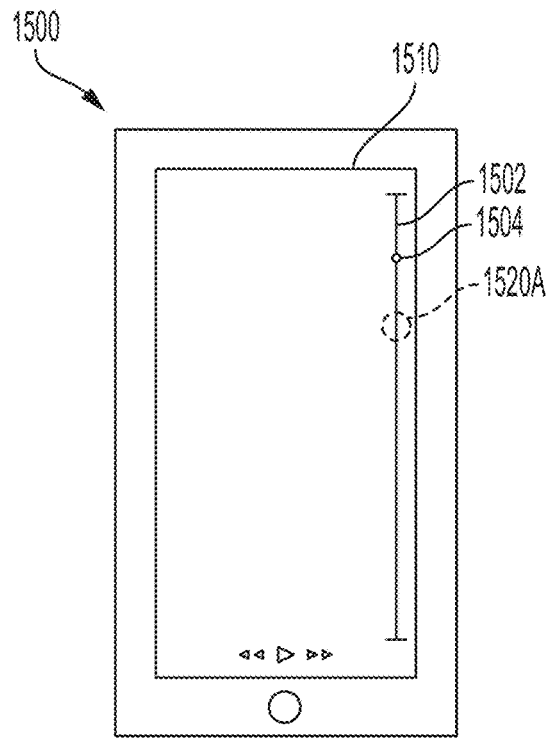
FIGS. 15A-15D illustrate examples of a user interface including a scrubber according to examples of the disclosure.
Figure 15B:
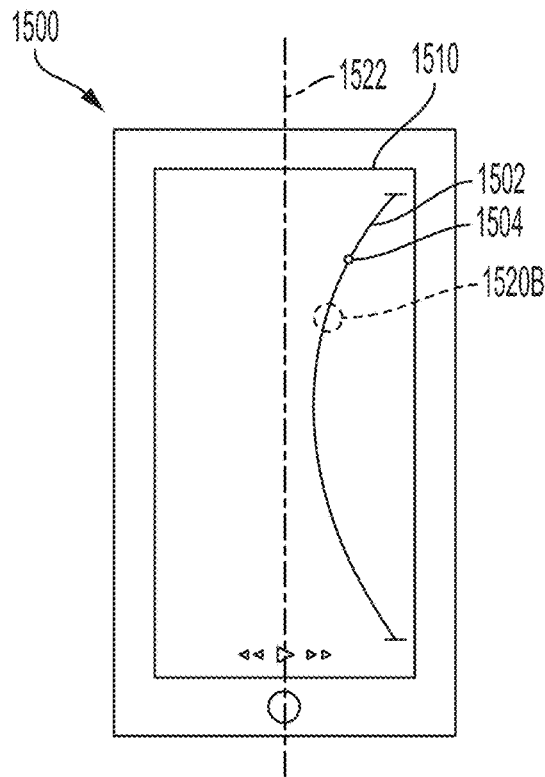
Figure 15C:
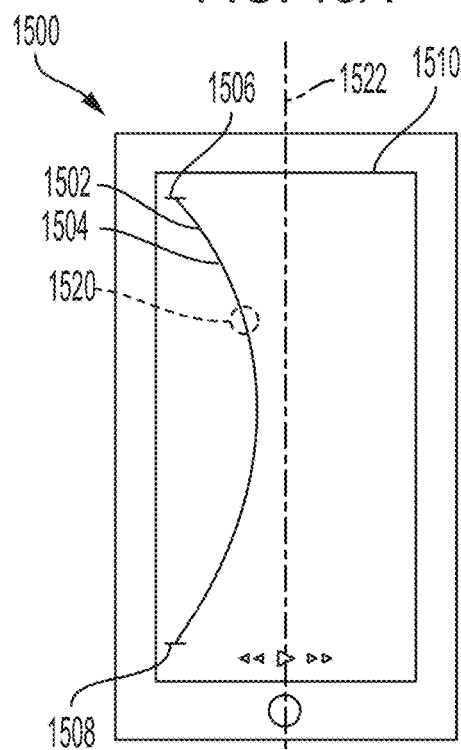

FIGS. 15A-15D illustrate examples of a draggable scrubber that may snap to a location with a rubber band effect. In FIG. 15A, device 1500 is displaying a first video asset in a portrait orientation with the scrubber bar 1502 of adaptive scrubber 1510 oriented vertically at a first position on the right side of the display. The device 1500 may detect a first location of touch 1520A by the user along the scrubber bar 1502 in the same manner described above with respect to FIGS. 14A-14B. Referring to also to FIG. 15B, the user may drag the scrubber bar to a second location of touch 1520B. The scrubber bar 1502 is showcasing the rubber band effect, where a portion of the scrubber bar 1502 in FIG. 15B "stretches" to move with the location of touch from the first position 1520A to the second position 1520B. Still referring to FIG. 15B, the second location of touch is to the right of the centerline 1522 of the device 1500, thus, the scrubber bar 1502 may snap back to the right side of the display of the device 1500 if the user were to remove pressure, e.g., no longer contact the display of the device 1500 at the second location of touch 1520B. In some examples, a line other than centerline 1522 could be used as the threshold to determine the side of the display the scrubber bar 1502 will snap back.

Figure 15D:
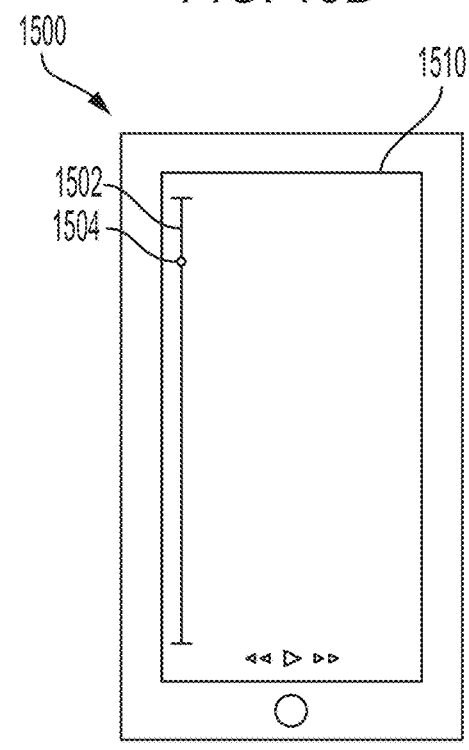

According to some examples the second location of touch may be located to the left of the centerline of the device. For example, in FIG. 15C, the user may drag the scrubber bar 1502 to a second location of touch 1520C to the left of the centerline 1522. Once the second location of touch 1520C moves to the left of the centerline 1522, the start position 1506 and end position 1508 of the scrubber bar 1502 may snap to position on the left side of the display of the device 1500. Once the user lifts the finger or stylus corresponding to the second location of touch 1520C, the scrubber bar 1502 may snap fully into place as illustrated in FIG. 15D.

In some examples, the media content application may prompt a user to select a preferred amount of mobility for the scrubber bar, e.g., no movement, free movement, snap to location, rubber band effect. In some examples, a user may be able to configure the mobility of the scrubber bar in the settings of the video application.

The examples described above may operate on one or more computers (e.g., one or more servers), including non-transitory computer readable recording media on a computer. This readable media contains the program instructions for accomplishing various steps described above. In the context of this disclosure, a computer-readable recording medium can be any medium that can contain or store programming for use by or in connection with an instruction execution system, apparatus, or device. Such computer readable media may be stored on a memory, where a memory is any device capable of storing a computer readable medium and capable of being accessed by a computer. A memory may include additional features. As used herein, a computer can comprise a conventional computer or one or more mobile devices. A computer may include a processor. A processor can be any device suitable to access a memory and execute a program stored thereon.

Communications may be transmitted between nodes over a communications network, such as the Internet. Other communications technology may include, but is not limited to, any combination of wired or wireless digital or analog communications channels, such as instant messaging (IM), short message service (SMS), multimedia messaging service (MMS) or a phone system (e.g., cellular, landline, or IP-based). These communications technologies can include Wi-Fi, Bluetooth, or other wireless radio technologies.

Examples of the disclosure may be implemented in any suitable form, including hardware, software, firmware, or any combination of these. Examples of the disclosure may optionally be implemented partly as computer software running on one or more data processors and/or digital signal processors. The elements and components of an example of the disclosure may be physically, functionally, and logically implemented in any suitable way. Indeed, the functionality may be implemented in a single unit, in multiple units, or as part of other functional units. As such, examples of the disclosure may be implemented in a single unit or may be physically and functionally distributed between different units and processors.

Figure 8:
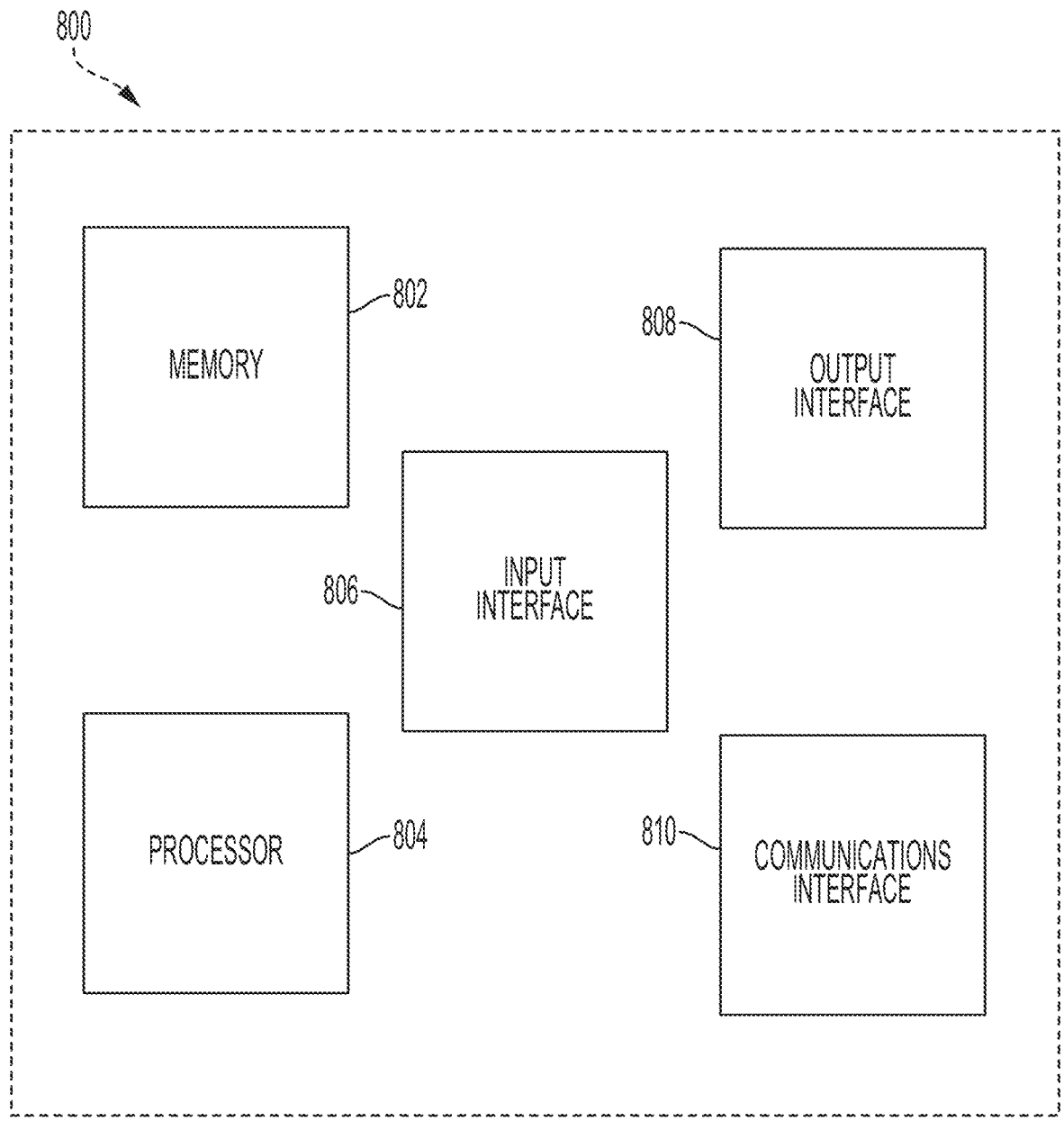
FIG. 8 illustrates an example computer system for implementing various examples of the disclosure.

FIG. 8 illustrates an example computer 800 (which may comprise a mobile device) capable of implementing the disclosed examples. Example computer 800 includes a memory 802, a processor 804, an input interface 806, an output interface 808, and a communications interface 810.

Memory 802 may include volatile and non-volatile storage. For example, memory storage may include read only memory (ROM) in a hard disk device (HDD), random access memory (RAM), flash memory, and the like. The Operating System (OS) and application programs may be stored in ROM.

Specific software modules that implement embodiments of the described systems and methods may be incorporated in application programs on a server. The software may execute under control of an OS.

Processor 804 may include any device suitable to access a memory and execute a program stored thereon.

Input interface 806 may include a keyboard or mouse, for example. Output interface 808 may include a conventional color monitor and printer, such as a conventional laser printer. Output interface 808 may provide requisite circuitry to electrically connect and interface the display and printer to the computer system.

Communications interface 810 may allow the network and nodes to connect directly, or over another network, to other nodes or networks. The network can include, for example, a local area network (LAN), a wide area network (WAN), or the Internet. In some examples, the network, modules, and nodes can be connected to another client, server, or device via a wireless interface.

In some examples, the input interface, processor, memory, communications interface, output interface, or combinations thereof, are interconnected by a bus.

The disclosed examples could be embodied as a JAVA tool, which means it can run on any platform that is JAVA enabled. Examples can run on a web server that provides a website for administrators to monitor the system results remotely. Anyone with administrative access to the web server can connect to and use visualization tools to take actions within a visualization. The examples can run on any type of server, including virtual servers or an actual machine. While JAVA is provided as an example, any suitable programming language or technology can be used to implement the examples of the disclosure.

The disclosed examples may be embodied on a distributed processing system to break processing apart into smaller jobs that can be executed by different processors in parallel. The results of the parallel processing could then be combined once completed.

Although the present invention has been fully described in connection with examples thereof with reference to the accompanying drawings, it is to be noted that various changes and modifications will become apparent to those skilled in the art. Such changes and modifications are to be understood as being included within the scope of the claimed subject matter. The various examples of the invention should be understood that they have been presented by way of example only, and not by way of limitation. Although the invention is described above in terms of various examples and implementations, it should be understood that the various features and functionality described in one or more of the individual examples are not limited in their applicability to the particular example with which they are described. They instead can, be applied, alone or in some combination, to one or more of the other examples of the invention, whether or not such examples are described, and whether or not such features are presented as being a part of a described example. Thus the breadth and scope of the claimed subject matter should not be limited by any of the above-described examples.

Terms and phrases used in this document, and variations thereof, unless otherwise expressly stated, should be construed as open ended as opposed to limiting. As examples of the foregoing, the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known," and terms of similar meaning, should not be construed as limiting the item described to a given time period, or to an item available as of a given time. These terms should instead be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. For example, "at least one" may refer to a single or plural and is not limited to either. The presence of broadening words and phrases such as "one or more," "at least," "but not limited to," or other like phrases in some instances shall not be read to mean that the narrower case is intended or required in instances where such broadening phrases may be absent. The word "exemplary" is used herein to mean "serving as an example or illustration." Any aspect or design described herein as "exemplary" is not necessarily to be construed as preferred or advantageous over other aspects or designs.

It will be appreciated that, for clarity purposes, the above description has described examples of the invention with reference to different functional units and modules. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization. It should be understood that the specific order or hierarchy of steps in the processes disclosed herein is an example of exemplary approaches. Based upon design preferences, it is understood that the specific order or hierarchy of steps in the processes may be rearranged while remaining within the scope of the claimed subject matter. Further, in some examples, some steps in the processes disclosed herein may be forgone altogether while remaining within the scope of the claimed subject matter.

What is claimed is:

1. A method comprising:

receiving, at a handheld device comprising a display having a first dimension and a second dimension and an orientation sensor, a plurality of assets comprising:
  a first video asset associated with a first aspect ratio; and
  a second video asset associated with a second aspect ratio, different from the first aspect ratio, wherein one of the first dimension or the second dimension corresponds to a height of the display and the other corresponds to a width of the display, the height of the display having a length greater than a length of the width of the display;

determining, based on an output of the orientation sensor, a desired aspect ratio;

in accordance with a determination that the desired aspect ratio is closer to the first aspect ratio than to the second aspect ratio, selecting the first video asset and further selecting a first playback interface, wherein the first playback interface configuration includes orienting the play interface in a first direction along the first dimension of the display;

in accordance with a determination that the desired aspect ratio is closer to the second aspect ratio than to the first aspect ratio, selecting the second video asset and further selecting a second playback interface configuration associated with the second aspect ratio for the playback interface, wherein the second playback interface configuration includes orienting the playback interface in a second direction along the first dimension of the display, the second direction different from the first direction;

presenting, via the display, the selected video asset at the desired aspect ratio;

determining a location of a user's hand grasping the handheld device with respect to the display;

determining, based on the location of the user's hand, a desired display location, wherein the desired display location corresponds to a region occupying a portion of the display; and presenting, via the display, concurrently with presenting the selected video asset, the playback interface positioned at the desired display location with the selected playback interface configuration.

2. The method of claim 1, wherein the playback interface comprises:

a scrubber bar having a start point and an end point;
a slider of the scrubber bar; and
a plurality of playback controls.

3. The method of claim 2, further comprising:
receiving input corresponding to a playback control of the plurality of playback controls; and
in response to receiving the input:
determining, based on the playback control, a command corresponding to one or more of a rewind command, a pause command, a play command, and a fast-forward command; and
executing the command.

4. The method of claim 1, wherein the playback interface comprises a scrubber bar having a first length when presented with the first playback interface configuration and a second length the same as the first length when presented with the second playback interface configuration.

5. The method of claim 1, further comprising:
receiving a first input corresponding to an icon associated with a social networking platform;
receiving a second input identifying a target user of the social networking platform; and
in response to receiving the second input, sending a link to the target user, wherein the link is associated with a first location of the first video asset and is further associated with a second location of the second video asset, the second location corresponding to the first location.

6. The method of claim 5, wherein the link is further associated with the selected video asset.

7. The method of claim 1, further comprising:
determining a first focus region associated with the selected video asset;
wherein presenting the selected playback interface comprises presenting the selected playback interface in a second region of the display that does not overlap with the first focus region.

8. The method of claim 7, wherein determining the first focus region comprises determining the first focus region based on metadata associated with the selected video asset.

9. The method of claim 7, wherein determining the first focus region comprises determining the first focus region based on video display data associated with the selected video asset.

10. A handheld device comprising:
a display having a first dimension and a second dimension, wherein one of the first dimension or the second dimension corresponds to a height of the display and the other corresponds to a width of the display, the height of the display having a length greater than a length of the width of the display;
an orientation sensor; and
one or more processors configured to execute instructions which, when executed, cause the handheld device to perform a method comprising:
receiving a plurality of assets comprising:
a first video asset associated with a first aspect ratio; and
a second video asset associated with a second aspect ratio, different from the first aspect ratio;
determining, based on an output of the orientation sensor, a desired aspect ratio;
in accordance with a determination that the desired aspect ratio is closer to the first aspect ratio than to the second aspect ratio, selecting the first video asset and further selecting a first playback interface configuration associated with the first aspect ratio for a playback interface, wherein the first playback interface configuration includes orienting the playback interface in a first direction along the first dimension of the display;
in accordance with a determination that the desired aspect ratio is closer to the second aspect ratio than to the first aspect ratio, selecting the second video asset and further selecting a second playback interface configuration associated with the second aspect ratio for the playback interface, wherein the second playback interface configuration includes orienting the playback interface in a second direction along the first dimension of the display, the second direction different from the first direction;
presenting, via the display, the selected video asset at the desired aspect ratio;
determining a location of a user's hand grasping the handheld device with respect to the display;
determining, based on the location of the user's hand, a desired display location, wherein the desired display location corresponds to a region occupying a portion of the display; and
presenting, via the display, concurrently with presenting the selected video asset, the playback interface positioned at the desired display location with the selected playback interface configuration.

11. The device of claim 10, wherein the playback interface comprises:
a scrubber bar having a start point and an end point;
a slider of the scrubber bar; and
a plurality of playback controls.

12. The device of claim 11, wherein the method further comprises:
receiving input corresponding to a playback control of the plurality of playback controls; and
in response to receiving the input:
determining, based on the playback control, a command corresponding to one or more of a rewind command, a pause command, a play command, and a fast-forward command; and executing the command.

13. The device of claim 10, wherein the playback interface comprises a scrubber bar having a first length when presented with the first playback interface configuration and a second length the same as the first length when presented with the second playback interface configuration.

14. The device of claim 10, wherein the method further comprises:
receiving a first input corresponding to an icon associated with a social networking platform;
receiving a second input identifying a target user of the social networking platform; and in response to receiving the second input, sending a link to the target user, wherein the link is associated with a first location of the first video asset and is further associated with a second location of the second video asset, the second location corresponding to the first location.

15. The device of claim 14, wherein the link is further associated with the selected video asset.

16. The device of claim 10, wherein the method further comprises:
determining a first focus region associated with the selected video asset, and
wherein presenting the selected playback interface comprises presenting the playback interface in a second region of the display that does not overlap with the first focus region.

17. The device of claim 16, wherein determining the first focus region comprises determining the first focus region based on metadata associated with the selected video asset.

18. The device of claim 16, wherein determining the first focus region comprises determining the first focus region based on video display data associated with the selected video asset.

19. A non-transitory computer-readable medium storing instructions which, when executed by one or more processors, cause the one or more processors to execute a method comprising:
receiving, at a handheld device comprising a display having a first dimension and a second dimension and an orientation sensor, a plurality of assets comprising:
a first video asset associated with a first aspect ratio; and
a second video asset associated with a second aspect ratio, different from the first aspect ratio;
wherein one of the first dimension or the second dimension corresponds to a height of the display and the other corresponds to a width of the display, the height of the display having a length greater than a length of the width of the display;
determining, based on an output of the orientation sensor, a desired aspect ratio;
in accordance with a determination that the desired aspect ratio is closer to the first aspect ratio than to the second aspect ratio, selecting the first video asset and further selecting a first playback interface configuration associated with the first aspect ratio for a playback interface, wherein the first playback interface configuration includes orienting the playback interface in a first direction along the first dimension of the display;
in accordance with a determination that the desired aspect ratio is closer to the second aspect ratio than to the first aspect ratio, selecting the second video asset and further selecting a second playback interface associated with the second aspect ratio for the playback interface, wherein the second playback interface configuration includes orienting the playback interface in a second direction along the first dimension of the display, the second direction different from the first direction;
presenting, via the display, the selected video asset at the desired aspect ratio;
determining a location of user's hand grasping the handheld device with respect to the display;
determining, based on the location of the user's hand, a desired display location, wherein the desired display location corresponds to a region occupying a portion of the display; and
presenting, via the display, concurrently with presenting the selected video asset, the selected playback interface positioned at the desired display location with the selected playback interface configuration.

20. The non-transitory computer-readable medium of claim 19, wherein the playback interface comprises:
a scrubber bar having a start point and an end point;
a slider of the scrubber bar; and
a plurality of playback controls.

21. The non-transitory computer-readable medium of claim 19, wherein the playback interface comprises a scrubber bar having a first length when presented with the first playback interface configuration and a second length the same as the first length when presented with the second playback interface configuration.

22. The non-transitory computer-readable medium of claim 19, wherein the method further comprises:
receiving a first input corresponding to an icon associated with a social networking platform;
receiving a second input identifying a target user of the social networking platform; and
in response to receiving the second input, sending a link to the target user, wherein the link is associated with a first location of the first video asset and is further associated with a second location of the second video asset, the second location corresponding to the first location.

23. The non-transitory computer-readable medium of claim 22, wherein the link is further associated with the selected video asset.

24. The non-transitory computer-readable medium of claim 19, wherein the method further comprises:
determining a first focus region associated with the selected video asset, and
wherein presenting the playback interface comprises presenting the selected playback interface in a second region of the display that does not overlap with the first focus region.

* * * * *